(12) United States Patent
Ito

(10) Patent No.: US 7,443,705 B2
(45) Date of Patent: Oct. 28, 2008

(54) APPARATUS AND METHOD FOR POWER CONVERSION HAVING DIODE IN CHARGING AND DISCHARGING CIRCUIT

(75) Inventor: Youichi Ito, Yokohama (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/653,842

(22) Filed: Jan. 17, 2007

(65) Prior Publication Data

US 2007/0115704 A1    May 24, 2007

Related U.S. Application Data

(62) Division of application No. 11/262,806, filed on Nov. 1, 2005, now abandoned.

(30) Foreign Application Priority Data

Nov. 2, 2004    (JP)    ............................. 2004-319935

(51) Int. Cl.
  *H02M 7/217*    (2006.01)
  *H02M 1/12*    (2006.01)
(52) U.S. Cl. ............................. 363/61; 363/44; 363/125
(58) Field of Classification Search ......... 363/125–127, 363/61, 44, 84, 47, 81, 129, 130, 48, 45–46, 363/52–53, 37, 143
See application file for complete search history.

(56) References Cited

U.S. PATENT DOCUMENTS

| | | | |
|---|---|---|---|
| 5,119,283 A * | 6/1992 | Steigerwald et al. | ........... 363/61 |
| 5,635,825 A | 6/1997 | Lesea | |
| 5,764,496 A * | 6/1998 | Sato et al. | ...................... 363/37 |
| 5,771,159 A | 6/1998 | Sako et al. | |
| 6,137,700 A | 10/2000 | Iida et al. | |
| 6,154,380 A | 11/2000 | Assow et al. | |
| 6,212,083 B1 | 4/2001 | Sakakibara | |
| 6,483,731 B1 | 11/2002 | Isurin et al. | |
| 6,608,770 B2 | 8/2003 | Vinciarelli et al. | |
| 6,747,881 B2 * | 6/2004 | Schreiber | ...................... 363/37 |
| 6,794,929 B2 | 9/2004 | Pelly | |

* cited by examiner

*Primary Examiner*—Jeffrey L. Sterrett
*Assistant Examiner*—Harry Behm
(74) *Attorney, Agent, or Firm*—Young & Thompson

(57) ABSTRACT

A power converting apparatus includes a rectifying circuit having a pair of AC power input terminals and a pair of rectified voltage output terminals; a reactor; and a charging and discharging circuit connected between the rectified voltage output terminals. The charging and discharging circuit includes a first condenser connected with one of the rectified voltage output terminals and one of the AC power input terminals; and a second condenser connected with the other of the rectified voltage output terminals and the one AC power input terminal. The reactor generates a resonance current together with the first condenser and the second condenser, and the second condenser discharges to zero voltage while the first condenser is charged.

7 Claims, 22 Drawing Sheets

APPARATUS AND METHOD FOR POWER CONVERSION HAVING DIODE IN CHARGING AND DISCHARGING CIRCUIT

BACKGROUND OF THE INVENTION

1. Field of the Invention

The present invention relates to a power converting apparatus and a power converting method, and in particular, relates to a power converting apparatus involving a rectifier and a power converting method.

2. Description of the Related Art

A converter incorporated into a power supply circuit of an air-conditioning equipment and so on is generally used as a single-phase full-wave rectifier circuit. Power factor improvement and suppression of harmonic wave generation are required for the converter. As shown in FIG. 1, a basic circuit of the converter used for the air-conditioning equipment and so on is configured to have a full-wave rectifier circuit (rectifier bridge circuit) 102 connected with an AC power supply 101, and a load 103 such as a DC motor. To such a basic circuit, a smoothing capacitor 104, and a reactor 105 for the power factor improvement (inductive AC impedance) are added. As described in Japanese Laid Open Patent Application (JP-A-Heisei, 10-174442: first conventional example), such a converter has difficulty in obtaining "great power factor improvement effect due to a large phase delay of a fundamental wave, although input current conduction angle extension effect can be expected", and it is not possible to meet the requirement to the converter because the power factor is low (as an example: 0.75 to 0.8).

A converter in which a voltage boosting circuit is mounted between power supply terminals is shown in the first conventional example. As shown in FIG. 2, in the converter having the voltage boosting circuit, boosting capacitors 107 and 108 are added to the rectifier circuit 102 for the voltage boosting circuit 100. An intermediate node 109 in the voltage boosting circuit is connected through a connection wire 111 to one of AC power input nodes of the rectifier circuit to which AC power is supplied. A two-directional switch 110 is introduced in the connection wire 111. Such a conventional technique has advantages in that the power factor is improved and higher harmonic wave suppression can be attained. However, the technique in the first conventional example inevitably uses the two-directional switch to connect the voltage boosting circuit and the full-wave rectifier circuit. In the technique, a switching frequency is a same extent as a power supply frequency (approximately one to several times the power supply frequency), which is extremely low unlike PWM control. As a result, the technique in the first conventional example effectively overcomes a problem of electromagnetic interference. Consequently, miniaturization and light weight of an apparatus may be possible.

The technique in the first conventional example would be specifically realized as shown in FIG. 3. For realizing the two-directional switch, a specific technique requires a current direction specifying circuit 106 composed of a set of four diodes and a switching element to control connection of electrolytic capacitors 107 and 108 (as an example: 1000 μF at 1500 W). Thus, many parts are required and the part must have a high breakdown voltage because the voltage boosting circuit is used so that the discharge voltage is high. As a result, the production cost increases. Also, main current causes a great loss due to inevitable passage through the two diodes and the switching element. Also, a high harmonic wave problem and a power factor problem are remained.

SUMMARY OF THE INVENTION

In an aspect of the present invention, a power converting apparatus includes a rectifying circuit having a pair of AC power input terminals and a pair of rectified voltage output terminals; a reactor; and a charging and discharging circuit connected between the rectified voltage output terminals. The charging and discharging circuit includes a first condenser connected with one of the rectified voltage output terminals and one of the AC power input terminals; and a second condenser connected with the other of the rectified voltage output terminals and the one AC power input terminal. The reactor generates a resonance current together with the first condenser and the second condenser, and the second condenser discharges to zero voltage while the first condenser is charged.

Here, a maximum value of a current flowing from one of the first condenser and the second condenser to the one AC input terminal at a rated operation may be substantially same as a maximum value of a rated input current.

Also, capacitances of the first condenser and the second condenser and an inductance of the reactor are preferably determined such that a resonance frequency is in a range of 3 times to 5 times of a frequency of AC power supplied to the AC power input terminals.

When a rated impedance is determined as a value obtained by dividing a second power of rated power by rated voltage, a square root of a value obtained by dividing the inductance by the capacitance is preferably in a range of 0.7 times to 1.2 times of the rated impedance.

Also, capacitances of the first condenser and the second condenser and an inductance of the reactor are preferably determined such that a resonance frequency is in a range of 3 times to 5 times of a frequency of AC power supplied to the AC power input terminals. Also, when a rated impedance is determined as a value obtained by dividing a second power of rated power by rated voltage, a square root of a value obtained by dividing the inductance by the capacitance is preferably in a range of 0.7 times to 1.2 times of the rated impedance.

Also, in another aspect of the present invention, a power converting apparatus includes a rectifying circuit having a pair of AC power input terminals and a pair of rectified voltage output terminals; a reactor; and a charging and discharging circuit connected between the rectified voltage output terminals. The charging and discharging circuit includes a first charging and discharging circuit connected with one of the rectified voltage output terminals and one of the AC power input terminals; and a second charging and discharging circuit connected with the other of the rectified voltage output terminals and the one AC power input terminal. The first charging and discharging circuit includes a first diode and a first condenser connected with the first diode in series. The second charging and discharging circuit may include a second diode and a second condenser connected with the second diode in series. The charging and discharging circuit further includes a switch section connected in parallel with a series connection of the first and second diodes, and the reactor generates a resonance current together with the first condenser and the second condenser.

Here, the switch section may include two switches which are connected in parallel with said first and second diodes, respectively.

Also, the switch section may include a switching element. Instead, each of the switches may include a switching element.

Also, a maximum value of a current flowing from one of the first condenser and the second condenser to the one AC input terminal at a rated operation may be substantially same as a maximum value of a rated input current.

Also, capacitances of the first condenser and the second condenser and an inductance of the reactor are preferably determined such that a resonance frequency is in a range of 3 times to 5 times of a frequency of AC power supplied to the AC power input terminals.

Also, when a rated impedance is determined as a value obtained by dividing a second power of rated power by rated voltage, a square root of a value obtained by dividing the inductance by the capacitance is preferably in a range of 0.7 times to 1.2 times of the rated impedance.

Also, capacitances of the first condenser and the second condenser and an inductance of the reactor are determined such that a resonance frequency is preferably in a range of 3 times to 5 times of a frequency of AC power supplied to the AC power input terminals.

Also, when a rated impedance is determined as a value obtained by dividing a second power of rated power by rated voltage, a square root of a value obtained by dividing the inductance by the capacitance is preferably in a range of 0.7 times to 1.2 times of the rated impedance.

Also, the power converting apparatus further includes a drive circuit which includes: a parallel circuit provided between a gate of the switching element and a control circuit. The parallel circuit may include a resistor circuit having a higher resistance; and a series circuit connected in parallel to the resistor circuit and comprising a resistor having a lower resistance, and a diode connected with the resistor to block off a gate current on charging of the gate.

Also, the switching element may receive, at a gate thereof, a voltage from a control power supply of the power converting apparatus through a resistor and a diode.

Also, the first and second condensers discharge to zero voltage once for one period of the AC power.

The power converting apparatus may further include mechanical switches provided between a common node and the first condenser and between the common node and the second condenser.

In another aspect of the present invention, a power converting apparatus may include a rectifying circuit having a pair of AC power input terminals and a pair of rectified voltage output terminals; a reactor; and a charging and discharging circuit connected between the rectified voltage output terminals. The charging and discharging circuit includes a first charging and discharging circuit connected with one of the rectified voltage output terminals and one of the AC power input terminals; and a second charging and discharging circuit connected with the other of the rectified voltage output terminals and the one AC power input terminal. The first charging and discharging circuit includes a first switch and a first condenser connected with the first switch in series. The second charging and discharging circuit includes a second switch and a second condenser connected with the second switch in series, and the reactor generates a resonance current together with the first condenser and the second condenser.

Also, capacitances of the first condenser and the second condenser and an inductance of the reactor are preferably determined such that a resonance frequency is in a range of 3 times to 5 times of a frequency of AC power supplied to the AC power input terminals.

In another aspect of the present invention, a power converting method is achieved by connecting a rectifying circuit with an AC power supply; by charging a first charging and discharging section which is connected between a first output terminal as one of two first output terminals of the rectifying circuit and one of two AC power input terminals of the rectifying circuit; by discharging from a second charging and discharging section which is connected between a second output terminal as the other of the two first output terminals of the rectifying circuit and the one AC power input terminal in synchronization with the charging; by charging the second charging and discharging section after a half period to the charging the first charging and discharging section; by discharging the first charging and discharging section in synchronization with the charging the second charging and discharging section; by continuing to connect a terminal of the first charging and discharging section on a side of the AC electric power input terminals and a terminal of the second charging and discharging section on a side of the AC electric power input terminals during a rated operation; and intermittently opening the terminal of the first charging and discharging section on the side of the AC electric power input terminals and the terminal of the second charging and discharging section on the side of the AC electric power input terminals during a low load operation.

Here, the first charging and discharging section and the second charging and discharging section may have condensers, respectively. A reactor may be provided between the AC electrode input terminal and the rectifying circuit or between the rectifying circuit and the first charging and discharging section. The maximum value of a current flowing from one of the first condenser and the second condenser to the one AC input terminal at a rated operation condition may be substantially same as the maximum value of the rated input current.

Also, capacitances of the first condenser and the second condenser and an inductance of the reactor are preferably determined such that a resonance frequency is in a range of 3 times to 5 times of a frequency of AC power supplied to the AC power input terminals.

Also, the first charging and discharging section and the second charging and discharging section may have condensers, respectively. A reactor may be provided between the AC electrode input terminal and the rectifying circuit or between the rectifying circuit and the first charging and discharging section. A charging period of one of the first and second condensers and a discharging period of the other condenser may be synchronized with each other. The condenser preferably discharges to zero voltage after being charged.

In this case, capacitances of the first condenser and the second condenser and an inductance of the reactor are determined such that a resonance frequency is preferably in a range of 3 times to 5 times of a frequency of AC power supplied to the AC power input terminals.

DESCRIPTION OF THE PREFERRED EMBODIMENTS

Hereinafter, a power converting apparatus according to the present invention will be described in detail with reference to the attached drawings.

Figure 4:
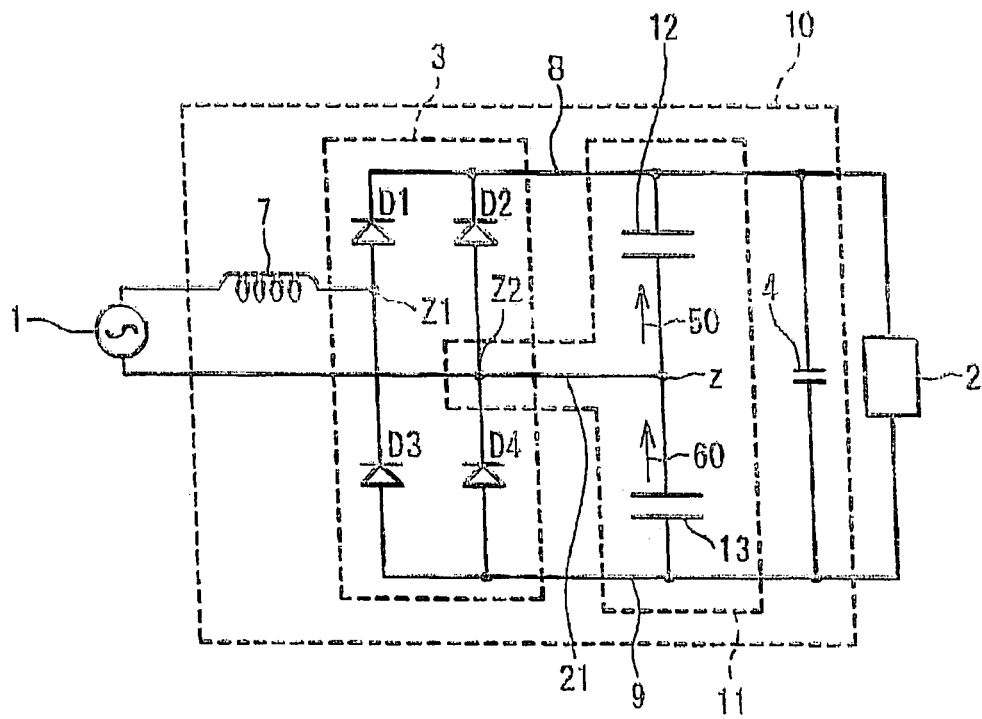
FIG. 4 is a circuit diagram showing the principle of a power converter apparatus according to a first embodiment of the present invention.

FIG. 4 is a diagram showing the principle of the power converting apparatus containing a power converting circuit 10. As shown in FIG. 4, the power converting circuit 10 is provided between an AC power supply 1 and a load 2 such as a motor and an inverter. The power converting circuit 10 is provided with a full-wave rectifier circuit 3 composed of diodes D1 to D4, and a charging and discharging circuit 11. A node Z1 of the full-wave rectifier circuit 3 between the diodes D3 and D1 is connected with one of terminals of the AC power supply 1 through a reactor 7. A node Z2 between the diodes D4 and D2 is connected directly with the other terminal of the AC power supply 1. A node between the diodes D1 and D2 functions as a positive output line 8, and a node between the diodes D3 and D4 functions as a negative output line 9. A smoothing condenser 4 is connected between the positive output line 8 and the negative output line 9. The reactor 7 may be provided between the full-wave rectifier circuit 3 and the charging and discharging circuit 11, although being not shown. An output of the rectifier circuit 3 is supplied to the load 2 through the positive output line 8. The power converting circuit 10 is further provided with a smoothing capacitor 4 connected between the positive output line 8 and the negative output line 9.

In the power converting circuit 10, the charging and discharging circuit 11 is added as a power factor improving circuit, instead of the voltage boosting circuit in the conventional examples. In the charging and discharging circuit 11, a condenser 12 as a first charging and discharging circuit and a condenser 13 as a second charging and discharging circuit portion are connected in series. An intermediate node Z between the condenser 12 and the condenser 13 is referred to as a "common node" in relation to the charging and discharging circuit, and is connected directly to the node Z2 by a conductive short-circuited line 21. The direction of current flowing from the common node Z to the positive-output line 8 is referred as a first polarity 50, and the direction of current flowing from the common node Z to the negative-output line 9 is referred as a second polarity 60.

Figure 5:
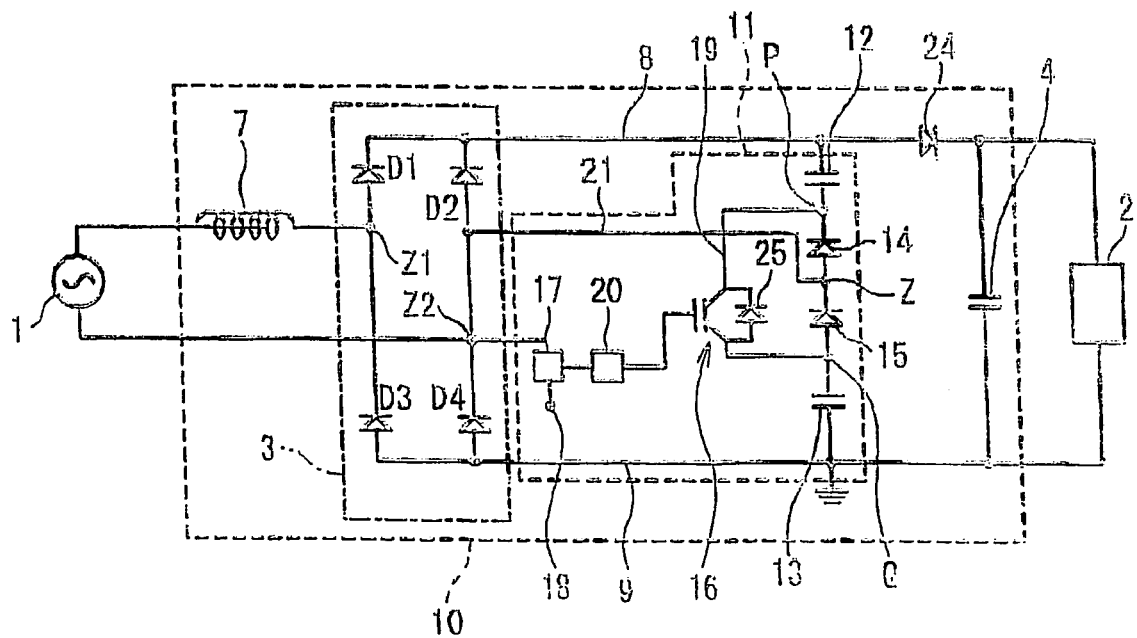
FIG. 5 is a circuit diagram showing the power converter apparatus according to the first embodiment of the present invention.

FIG. 5 is a circuit diagram showing an example of the power converting apparatus when the principle of the power converting circuit is realized. In this example, the charging and discharging circuit 11 is provided with the condensers 12, 13, diode 14 and 15, and a connection line 19. The condenser 12 is connected with the positive output line 8. A cathode of the diode 14 is connected with the condenser 12 through a node P and an anode of the diode 14 is connected with the common node Z. A cathode of the diode 15 is connected with the common node Z, and an anode of the diode 15 is connected with a node Q. The condenser 13 is connected between the node Q and the negative output line 9. The connection line 19 is connected between the nodes P and Q. The common node Z is connected with the node Z2 through the common line 21. Since the connection line 21 is realized in a short-circuited way, it is basically preferable that the common line 21 has no impedance component in both cases of DC and AC. The electric current flowing through the diode 14 has a current directionality (polarity) that the current flows from the common node Z to the condenser 12 in one direction. The current flowing through the diode 15 has a current directionality that the current flows from the condenser 13 to the common node Z in one direction. Depending on the selection of circuit constants, the diodes 14 and 15 are not necessarily required. However, it is sometimes difficult to select circuit parts such as the condensers and the reactor having ideal circuit constants. In addition, there is tolerance in each of the circuit parts. Therefore, it is usually difficult to configure a stable power converting circuit by using the circuit parts commercially available. Even in such a case, by adding the diodes 14 and 15, it is possible to easily establish the current directionality in one direction and to easily configure the power converting circuit having a high power factor, without taking much consideration to the circuit constants of the circuit parts.

Figure 3:
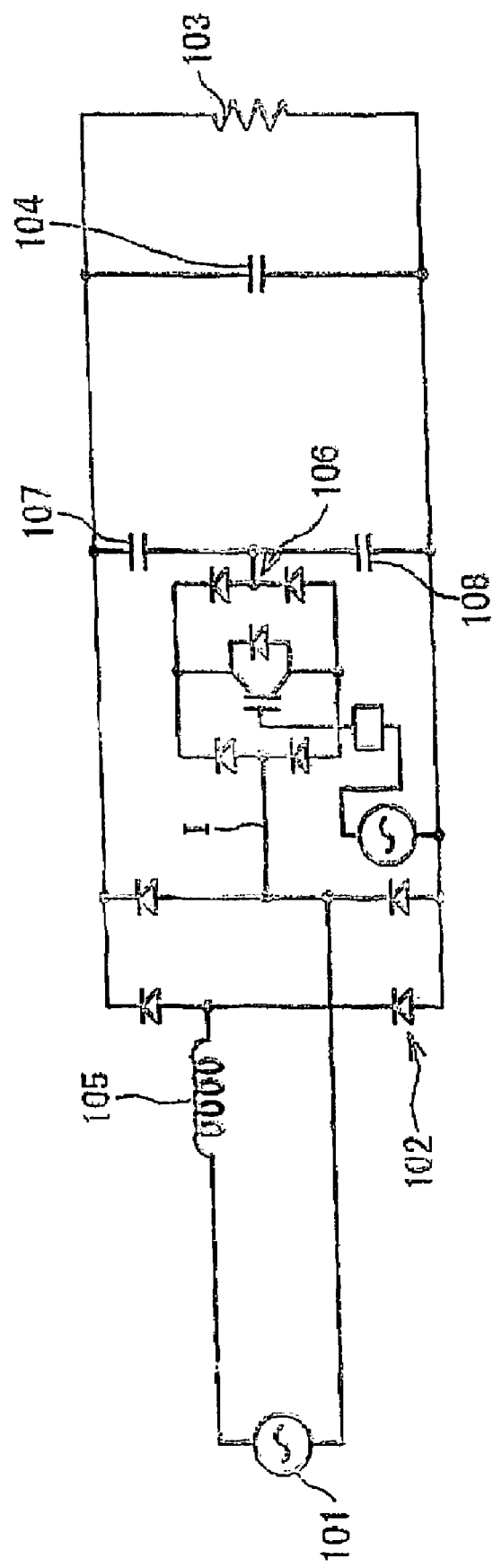
FIG. 3 is a circuit diagram showing a power converter apparatus as a third conventional example.

A feature of the common line 21 is that the current direction specifying circuit 106 (the two-directional switching circuit in FIG. 3 formed by a plurality of diodes (four or more) and a switching element (one or more)) is unnecessary. However, the present invention does not completely exclude such a circuit. It may be considered as an example to supplementarily insert such a switching circuit in the common line 21 for appropriate selection of the circuit constants and for power factor improvement. However, the power factor improvement is sufficiently realized without providing any electric element to the common line 21 in the present invention.

As shown in FIG. 5, the charging and discharging circuit 11 contains the connection line 19. The connection line 19 connects the node P between the diode 14 and the condenser 12 and the node Q between the diode 15 and the condenser 13 in two directions (in one direction in the embodiments as mentioned later). An operation mode control switch 16 (an example: IGBT (Insulated Gate Bipolar Transistor)) is inserted in the connection line 19. One terminal of the operation mode control switch 16 is connected to the node P between the condenser 12 and the diode 14. The other terminal of the operation mode control switch 16 is connected to the node Q between the condenser 13 and the diode 15. The operation mode control switch 16 is driven by a driver circuit 20 (an example: IGBT driver circuit). A switching signal generator 17 is connected to the driver circuit 20. A periodic electric signal of the AC power supply 1 is supplied from a terminal 18 to the switching signal generator 17. A voltage between the diode 14 and the diode 15 is represented as a voltage of the common node Z. The common node Z is connected to the node Z2 at all times in a short-circuited way in two directions through the common line 21. As mentioned later, the node P is one-sidedly connected to the node Z2 through the operation mode control switch 16 and the diode 15. The node Z2 is one-sidedly connected to the node Z1 through the diode 14 and the operation mode control switch 16. The node P is one-sidedly short-circuited to the node Q in a first operation mode (rated operation to be mentioned later). On the other hand, the node Q is disconnected from the node P in a second operation mode (lower load operation to be mentioned later) on all the time or periodically. As the operation mode control switch 16, various switching elements such as a bipolar transistor, a FET, and a MOSFET may be used besides the IGBT mentioned above.

Figure 6:
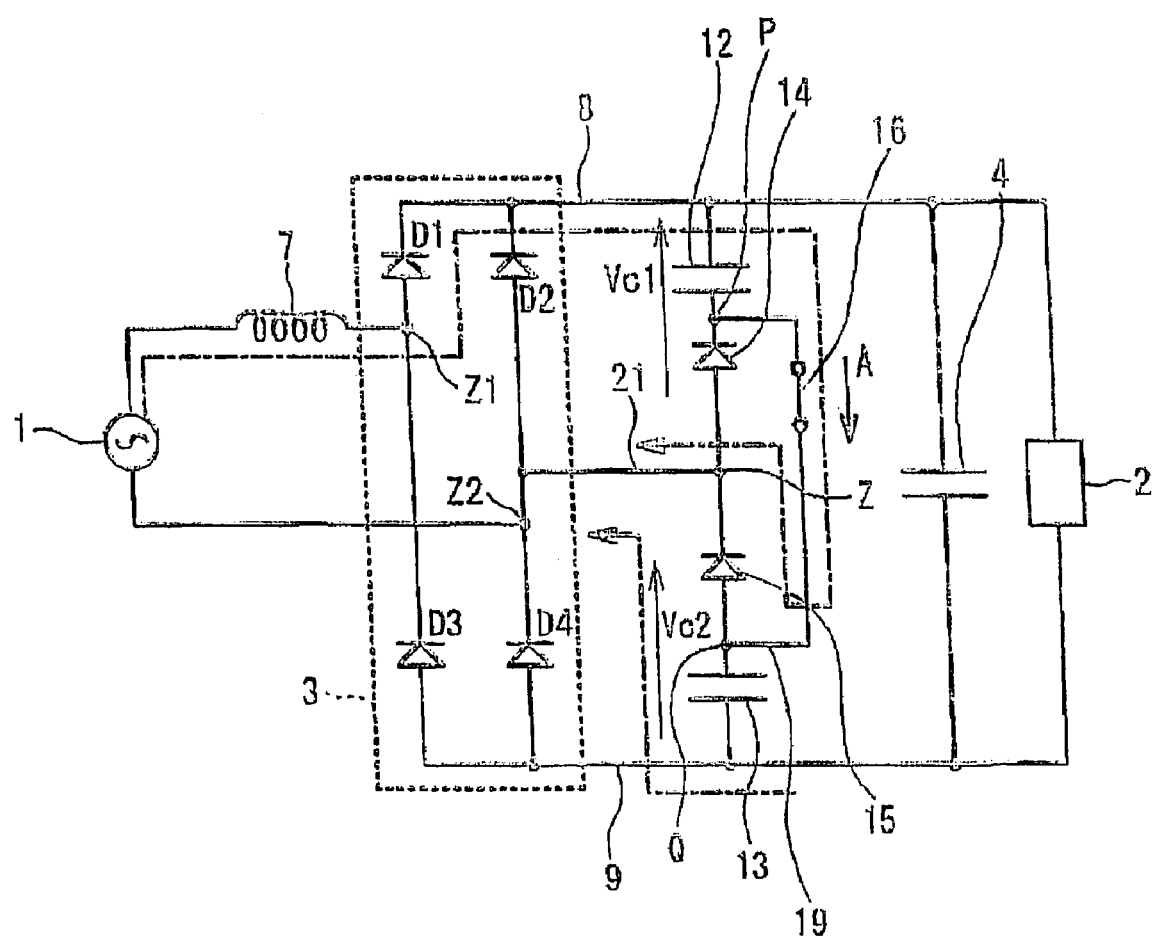
FIG. 6 is a circuit diagram showing an operation of the power converter apparatus according to the first embodiment of the present invention in a rated operation mode.
Figure 7:
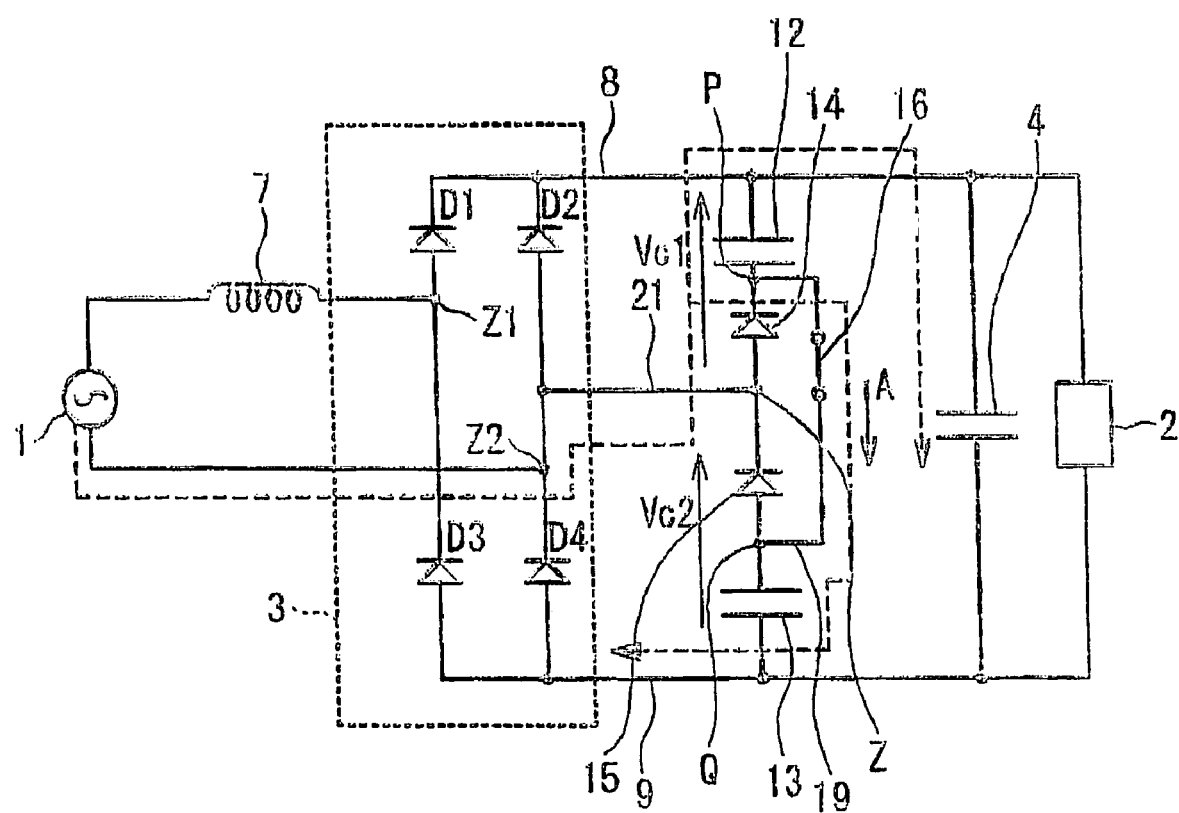
FIG. 7 is a circuit diagram showing an operation of the power converter apparatus according to the first embodiment of the present invention in a rated operation mode.

FIGS. 6 and 7 are circuit diagrams showing equivalent circuits of the power converting circuit shown in FIG. 5 in the first operation mode, for the convenience of explanation. The power converting circuit 10 of the present invention switches the operation mode between a first operation mode (a rated operation mode) and a second operation mode (a low load operation mode) in response to opening and closing operations of the operation mode control switch 16.

A First Half Cycle of the First Operation Mode:

FIG. 6 shows a circuit configuration of the first half cycle of the rated operation (an instantaneous phase $\theta=2n\pi$ $\omega t$ to $(2n+1)\pi$ $\omega t$, $\omega=2\pi f$, f is AC power supply frequency=charge and discharge frequency, t is time). As shown in FIG. 6 by a dashed line, in the power converting circuit in a closed state that the operation mode control switch 16 is closed, a current from the power supply 1 flows through a route of the reactor 7—the node Z1—the diode D1—the condenser 12—the node P—the operation mode control switch 16—the node Q—the diode 15—the common node Z—the common line 21—the node Z2 in order. The condenser 12 contained in such a charging path is charged to a voltage Vm' corresponding to a peak value Vm of the power supply voltage, as indicated by an equation: Vm'=Vm. Preferably, condenser constants (parameters of a differential equation indicating alternating resonance such as an AC power supply cycle, and a constant of the reactor 7) are specified. In such a charge period, the smoothing condenser 4 is charged by current flowing through the positive output line 8, and a driving current flows through the load 2. At the same time, as shown in a dashed line, the electric current is discharged from the smoothing condenser 4 into the condenser 13. As a result, discharge current outflows from the condenser 13. The discharge current is returned to the AC power supply 1 through the condenser 13, the diode 15, the common node Z, the common line 21, and the node Z2 in order. The charge current and discharge current interact with the reactor 7 and causes resonance. These currents are supplied to the load 2 through the common line 21 and the positive line 8. The charge current is supplied to the load 2 through the positive-output line 8. Such a charging and discharging operation improves the power factor approximately up to 1, as mentioned later.

A Second Half Cycle of the First Operation Mode:

FIG. 7 shows a circuit configuration of the power converting apparatus in the second half cycle of the rated operation (the instantaneous phase $\theta=(2n+1)\pi$ $\omega t$ to $(2n+2)\pi$ $\omega t$). As shown in FIG. 7 by a dotted line, in the power converting apparatus in the closed state in which the operation mode control switch 16 is closed, the electric current outputted from the AC power supply 1 comes back to the AC power supply 1 through the node Z2, the common line 21, the common node Z, the diode 14, the node P, the operation mode control switch 16, the node Q, the condenser 13, the diode D3 of the rectifier circuit 3, and the node Z1 in order. The condenser 13 contained in such a charging path is charged to a voltage Vm" corresponding to the peak value Vm of the power supply voltage as indicated by an equation Vm"=Vm. In the preferred embodiment, the same circuit constants as circuit constants described in the first half period of the rated operation mode are specified. In this charge period, the driving current flows from the smoothing condenser 4 through the positive-output line 8 to the load 2. Also, at the same time, the electric current flows into the condenser 12 through the diode 14 and the node P, as shown in the dashed line. As a result, the condenser 12 discharges and the discharge current flows into the smoothing condenser 4 and the load 2. Thus, the smoothing condenser 4 is charged. Then, the current is returned to the AC power supply 1 through the diode D3 of the rectifier circuit 3 and the node Z1. Such a charging and discharging operation has the resonance character, and improves the power factor approximately up to 1, as described above.

A switch for carrying out such alternate charging and discharging operation is not shown in FIG. 4 as a single element. The charging and discharging control switch appears as a combination of elements in connection of the rectifier circuit, the charging and discharging circuit, and the power supply circuit. Specifically, major parts are the first condenser 12, the second condenser 13, the reactor 7, and the common line 21 in FIG. 5. Further, the diodes 14 and 15 and a diode 24 are additionally combined.

A Full Cycle of a Second Operation Mode:

The second operation mode is a conventional operation mode, in which the operation mode control switch 16 is opened at low load, the charging and discharging circuit 11 does not operate, and the rectifier circuit 3 carries out full-wave rectification. The opening and closing control of the operation mode control switch 16 will be mentioned later.

In the power converting apparatus of the present invention, the operation mode control switch 16 is closed at all times in the rated operation mode, and is opened at all times in the low load operation mode. The operation mode control switch 16 is a one-directional switch for switching the mode between the rated operation mode and the low load operation mode. In order to make the electric current flowing into the load 2 smooth in the low load operation mode, a rectification means (an example: the diode 24) is inserted in the positive-output line 8 in a downstream side from the condenser 12. A means of making the electric current flowing into the load 2 smooth in the low load operation mode is not limited to additional provision of the diode 24. It is also suitable to design the circuit constants of a plurality of circuit elements in a circuit, or to provide a reactor to an appropriate position in the circuit.

Figure 8:
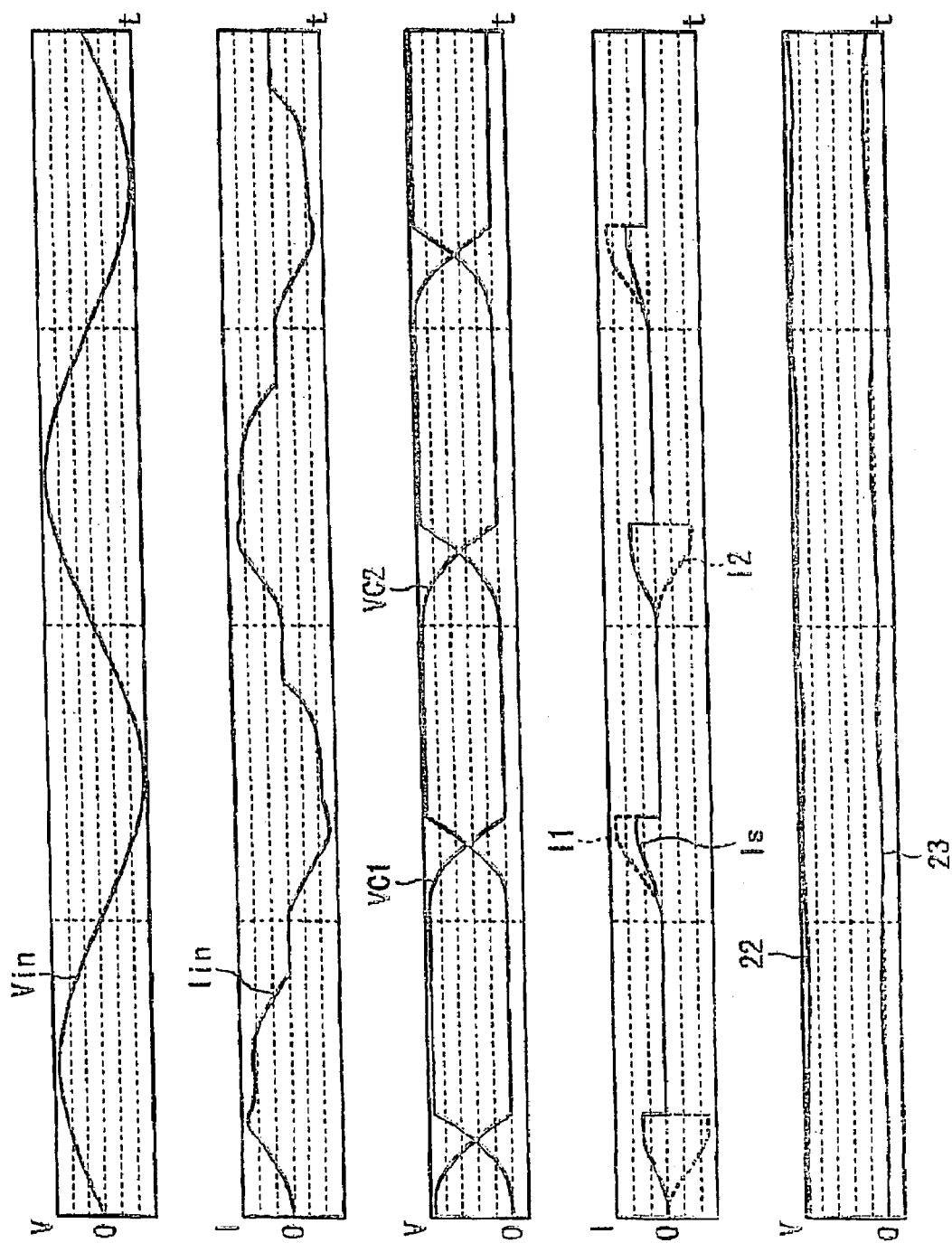
FIGS. 8A to 8E are diagrams showing current and voltage waveforms in respective sections of the power converter apparatus according to the first embodiment of the present invention in the rated operation mode.

FIGS. 8A to 8E show waveforms of the respective sections in the first operation mode. Horizontal axes in FIGS. 8A to 8E respectively show time. FIG. 8A shows input voltage Vin (an example: a sine wave) to be inputted to the rectifier circuit 3. FIG. 8B shows input current Iin to be inputted to the rectifier circuit 3. The input current Iin passes through a null current point for every half cycle. FIG. 8C shows a voltage VC1 across the condenser 12 and a voltage VC2 across the condenser 13. A charge period of the voltage VC1 and a discharge period of the voltage VC2 are synchronized almost completely, and a discharge period of the voltage VC1 and a charge period of the voltage VC2 are synchronized almost completely. That is, as shown in FIG. 8C, the condensers 12 and 13 completely discharge to the null voltage, and the electric current continues to flow during the discharge. FIG. 8D shows common line current I flowing through the common line 21 between the node Z2 and the common node Z. The common line current I (common line current through the common line 21) flows for the time during which the charging and discharging of the condenser 12 or the condenser 13 are reversed. That is, the common line current I2 flows from the common node Z to the node Z2 in the charge of the condenser 12 and the discharge of the condenser 13, and the common line current I1 flows from the node Z2 to the common node Z in the discharge of the condenser 12 and the charge of the condenser 13. A direction of switch current Is flowing through the operation mode control switch 16 is one direction. FIG. 8E shows output DC voltage (the voltage across the smoothing condenser 4) 22 applied to the load 2, and switch voltage 23 as a voltage across the operation mode control switch 16. The operation mode control switch 16 is closed at all times in the rated operation mode.

Figure 9:
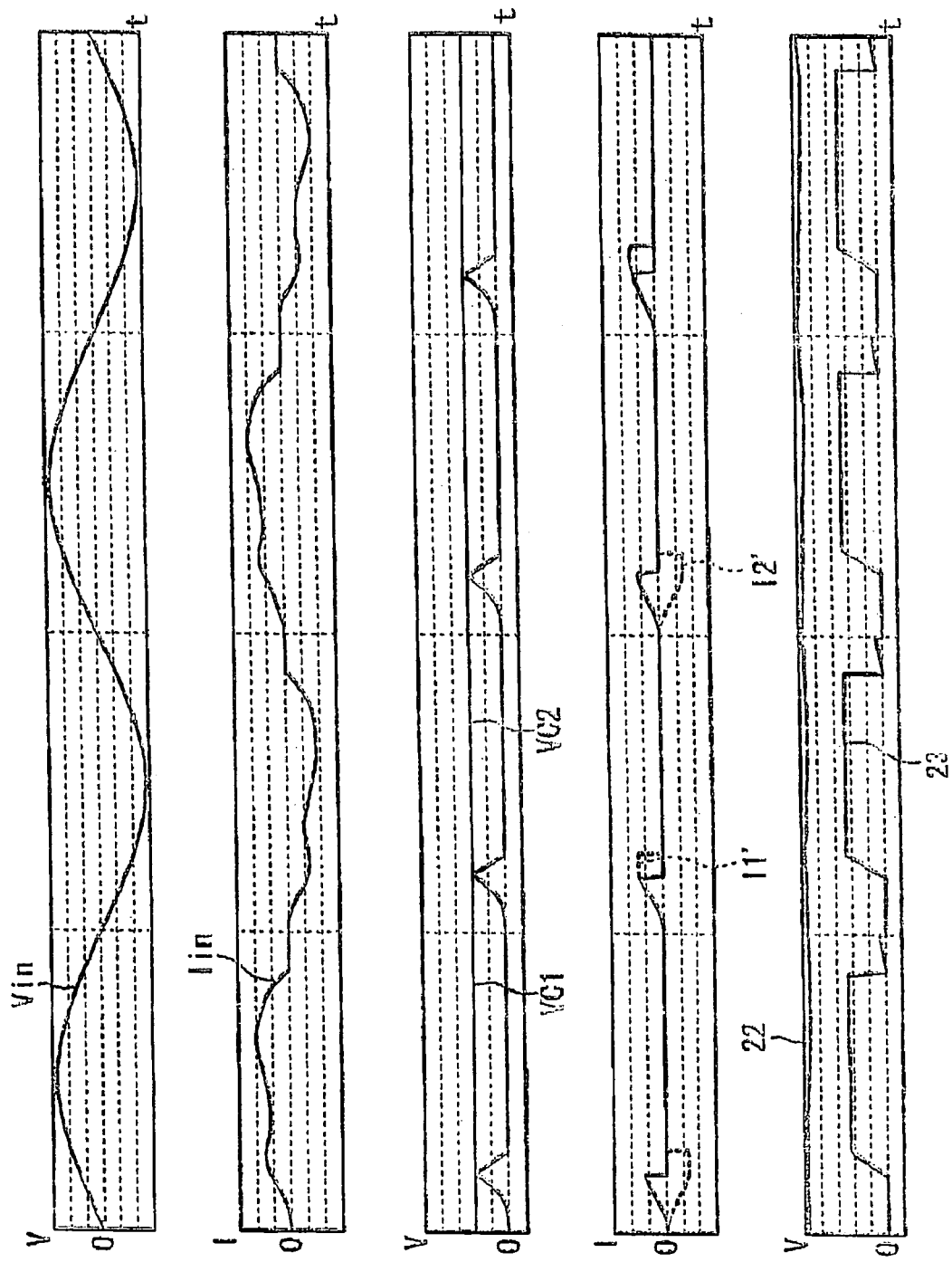
FIGS. 9A to 9E are diagrams showing current and voltage waveforms in respective sections of the power converter apparatus according to the first embodiment of the present invention in a lower load operation mode.

FIGS. 9A to 9E show operation waveforms of the second mode, in which the power factor improvement is attained by opening the operation mode control switch 16 as mentioned earlier. The input voltage Vin shown in FIG. 9A is the same as that of FIG. 8A, and the input current Iin shown in FIG. 9B is not the same as that of FIG. 8B. Thus, the power factor is improved. As shown in FIG. 9C, the voltage VC1 across the condenser 12 and the voltage VC2 across the condenser 13 respectively vary for every half period. Thereby, the condensers 12 and 13 repeat the charging operation and the discharging operation. Through ON/OFF control of the operation mode control switch 16 shown in FIG. 9E, common line currents I1' and I2' flow through the common line 21 as shown in FIG. 9D. Through the common line currents I1' and I2', the power factor can be improved at the time of the low load operation.

Figure 10:
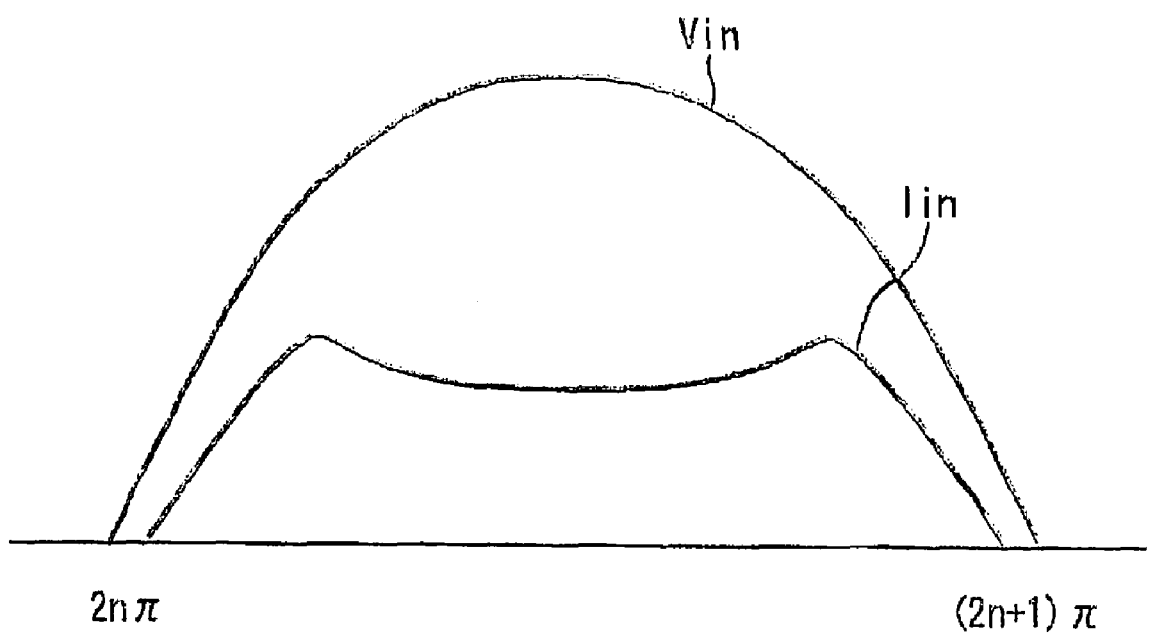
FIG. 10 is a diagram used to explain power factor.

FIG. 10 shows a waveform relation in the power factor improvement. The waveform relation shows a phase relation or an overlapping relation of the input voltage Vin (FIG. 8A) and the input current Iin (FIG. 8B) which are supplied to the rectifier circuit, in the present invention. Power P is expressed as a product of voltage V and current I. Instantaneous power p is expressed by the following equation.

$$P=VI$$

Average power P during one cycle T of the AC power ($=2\pi/\omega$) is expressed by the following equation as an average value of integration.

$$P=V'*I'*\cos\Psi$$

Here, V' and I' are effective values. In the present invention, the input current Iin is the discharge current discharged from the condenser 12 or the condenser 13 for every half period. Therefore, the voltage Vin and the current Iin are synchronized with each other in the half period, and a phase difference T between the input voltage Vin and the input current Iin is generally zero. Therefore, the power factor $\cos\Psi$ is approximately 1. The AC delay problem that the phase difference $\Psi$ between the input current Iin and the input voltage Vin increases is eliminated by the presence of the reactor 7 through the charge and discharge current, and the phase difference $\Psi$ is close to zero. Periodic switching of the charging operation and discharging operation resolves the problems of the electromagnetic interference as well as the power factor improvement, through suppression of the increase in output voltage. The decrease of output power can be made possible through the power factor improvement even if the output voltage is not increased, and as a result, it is possible to effectively resolve the power factor problem and the higher harmonic wave problem.

A combination of the operation mode control switch 16, the diodes 14 and 15, and the common line 21 forms a half-cycle alternate rectification charging and discharging circuit for supplementarily increasing the electric current from the positive-output line 8 to the load 2 through the discharging operation of one of the condensers 12 and 13 for every half period and eliminates the necessity of generation of double voltage by a boosting circuit. In such a charging and discharging circuit, a directionality of the operation mode control switch 16 is not required. A one-way directionality is enough and a two-way directionality is not necessary in reality. However, the operation mode control switch 16 is not necessarily forbidden to have the two-way directionality. Thus, various techniques can be used as the operation mode control switch 16.

Figure 11:
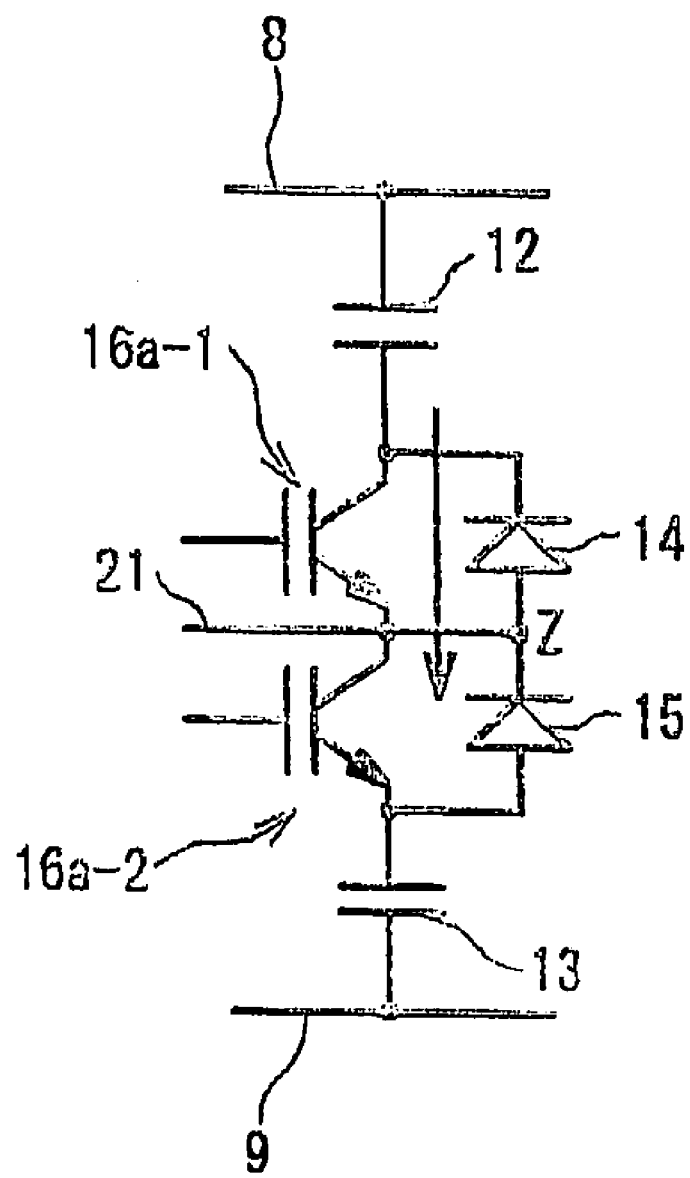
FIG. 11 is a circuit diagram showing the power converter apparatus according to a second embodiment of the present invention.

FIG. 11 shows the charging and discharging circuit according to the second embodiment of the present invention. In the second embodiment, the operation mode control switch 16 provided between the condenser 12 and the condenser 13, is formed as a serial connection of one-way switch elements 16a-1 and 16a-2. The switch elements 16a-1 and 16a-2 are connected in parallel with the diode 14 and 15, respectively. A node between the switch elements 16a-1 and 16a-2 and the common node Z between the diodes 14 and 15 are connected with the common line 21. As mentioned earlier, various switching elements such as a bipolar transistor, an IGBT, a FET, and a MOSFET may be used as the one-directional switch element 16a-1 or 16a-2. The number of switching elements is two in the second embodiment, which is larger compared with the number of switching elements in the first embodiment. However, the number of diodes is two and is the same as in the first embodiment.

Figure 12:
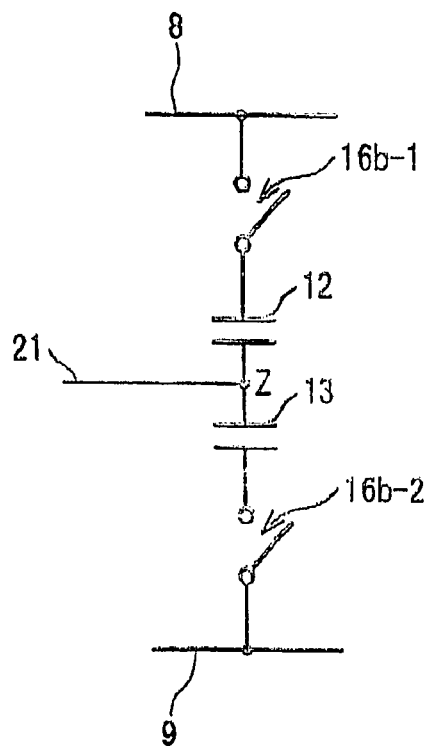
FIG. 12 is a circuit diagram showing the power converter apparatus according to a third embodiment of the present invention.

FIG. 12 shows the charging and discharging circuit according to the third embodiment of the present invention. In the third embodiment, a one or two-directional switch 16b-1 is provided between the positive-output line 8 and the condenser 12. Also, a one or two-directional switch 16b-2 is provided between the condenser 13 and the negative line 9. The third embodiment is the same as the second embodiment of FIG. 11 in the number of the elements.

Figure 13:
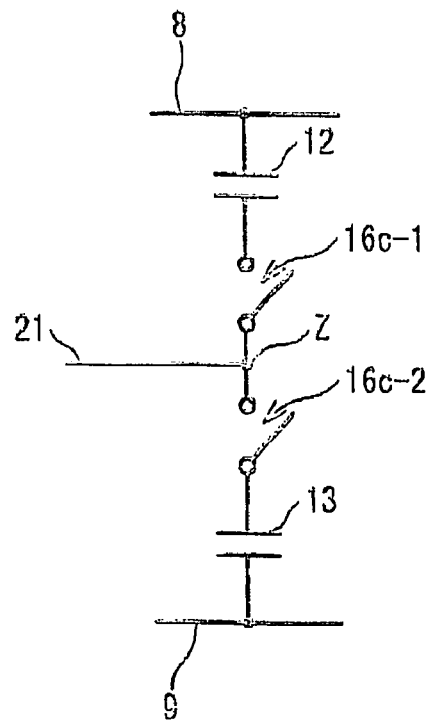
FIG. 13 is a circuit diagram showing the power converter apparatus according to a fourth embodiment of the present invention.

FIG. 13 shows the charging and discharging circuit according to the fourth embodiment of the present invention. In the fourth embodiment, a one or two-directional switch 16c-1 is provided between the condenser 12 and the common node Z. Also, a one or two-directional switch 16c-2 is provided between the common node Z and the condenser 13. The fourth embodiment is the same as the embodiments of FIGS. 11 and 12 in the number of the elements. In the fourth embodiment, the various switching elements as mentioned earlier may be applied.

In the above embodiments of the half-cycle alternate rectification charging and discharging circuit, the switching cycle (a discharge alternate cycle) is synchronized with (corresponds to) a cycle of the AC power supply 1.

Figure 1:
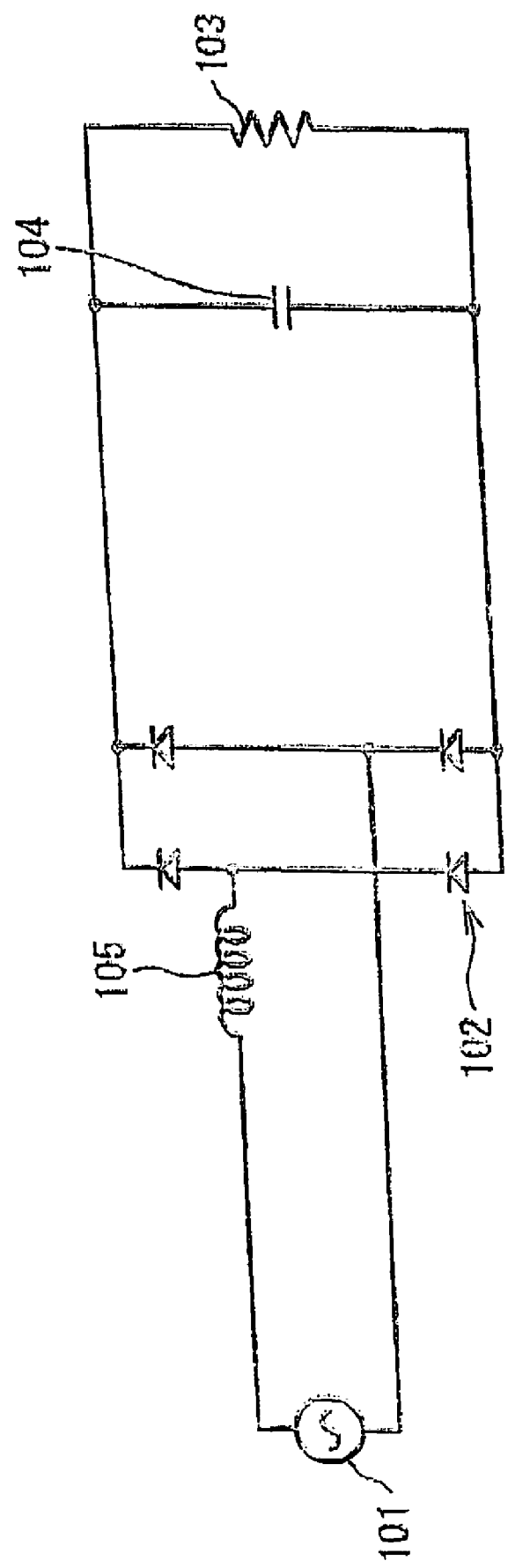
FIG. 1 is a circuit diagram showing a rectifying circuit as a first conventional example.
Figure 14:
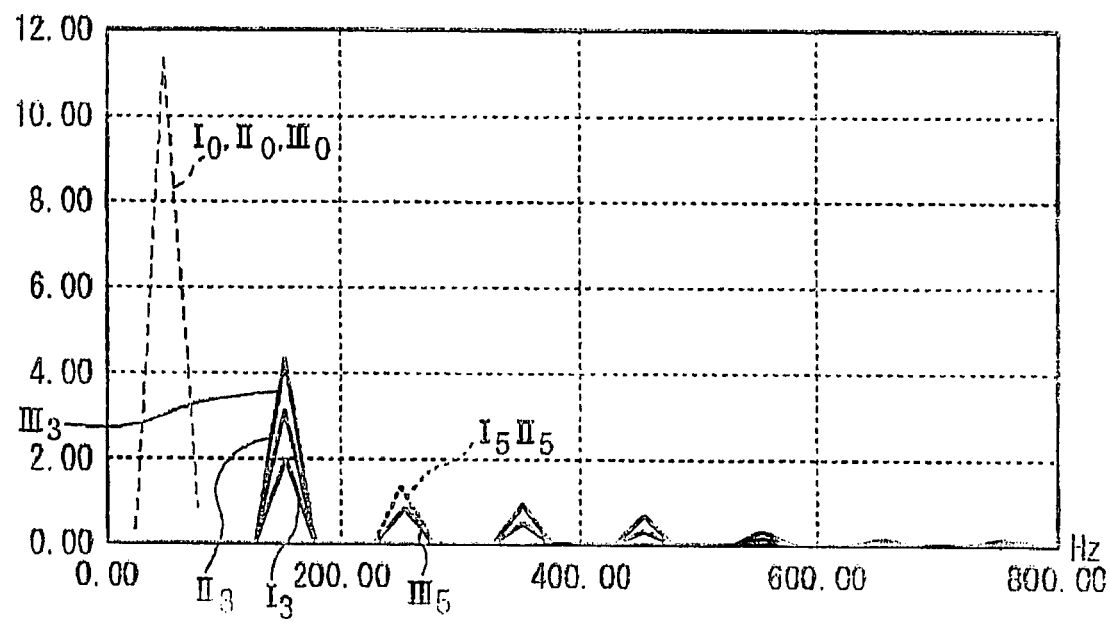
FIG. 14 is a diagram showing comparison of harmonic waves in the power converter apparatus of the present invention and harmonic waves in the conventional technique.

FIG. 14 shows the comparison in the higher harmonic wave of the power converting apparatus between the present invention and the conventional techniques. A horizontal axis and a vertical axis in FIG. 14 show frequency and amplitude of the higher harmonic waves, respectively. In each waveform, III shows a waveform of the higher harmonic wave of the conventional technique in FIG. 1; II shows a waveform of the higher harmonic wave of the conventional technique in FIG. 2; and I shows a waveform of the higher harmonic wave in the present invention in FIG. 4. Zero-th high harmonic waves (fundamental waves) are shown as I0, II0, and III0. Regarding a third higher harmonic wave and a fifth higher harmonic wave in question, third and fifth higher harmonic waves I3 and I5 of the present invention are markedly reduced than third and fifth higher harmonic waves II3, II5, III3, and III5 of the conventional technique. Since power supply current comes close to a sine-wave shape due to resonance current synchronized with a power supply cycle, the harmonic wave generation is suppressed.

Figure 15:
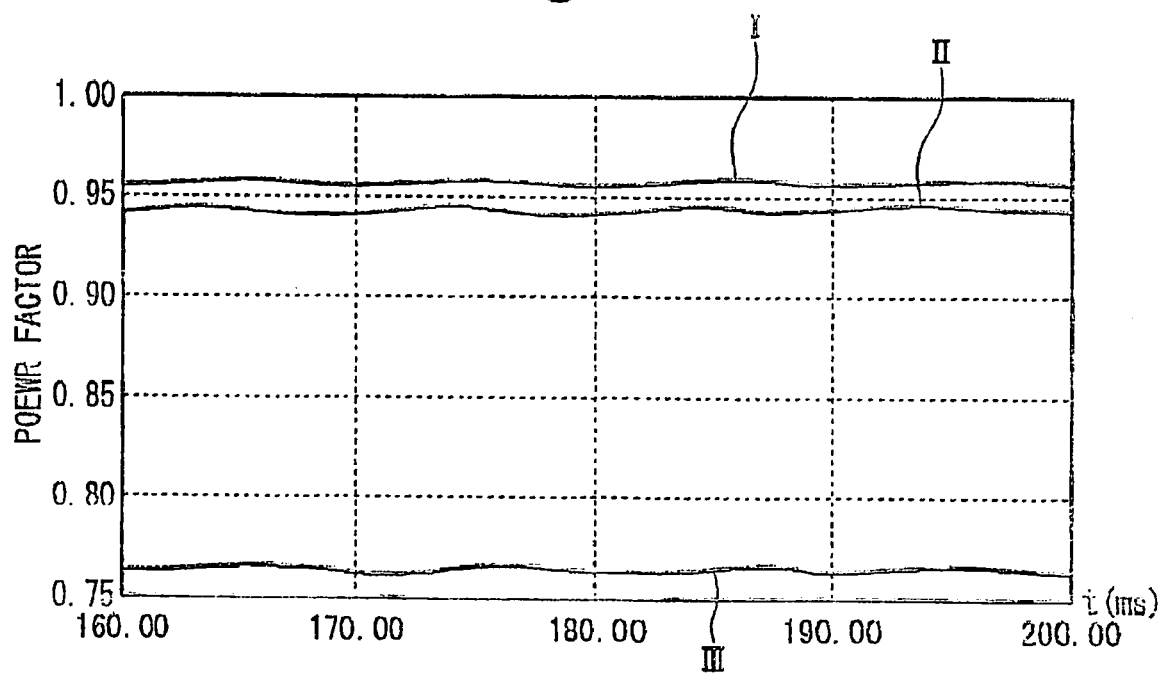
FIG. 15 is a diagram showing comparison of power factor in the power converter apparatus of the present invention and power factor in the conventional technique.

FIG. 15 shows comparison of the power factor of the power converting apparatus between the present invention and the conventional technique. The horizontal axis and the vertical axis in FIG. 15 show time (unit: ms) and the power factor, respectively. Regarding each power factor line, III shows power factor variation in the conventional technique of FIG. 1; II shows the power factor variation in the conventional technique of FIG. 2; and I shows the power factor variation in the present invention of FIG. 4. As shown in FIGS. 14 and 15, the present invention primarily resolves or improves the power factor problem. Consequently, the present invention resolves or improves the higher harmonic wave problem, and the extent of comprehensive resolution of the two problems in the present invention is markedly higher than in the conventional technique. As a result, the power converting apparatus can be greatly miniaturized ultimately.

Figure 16:
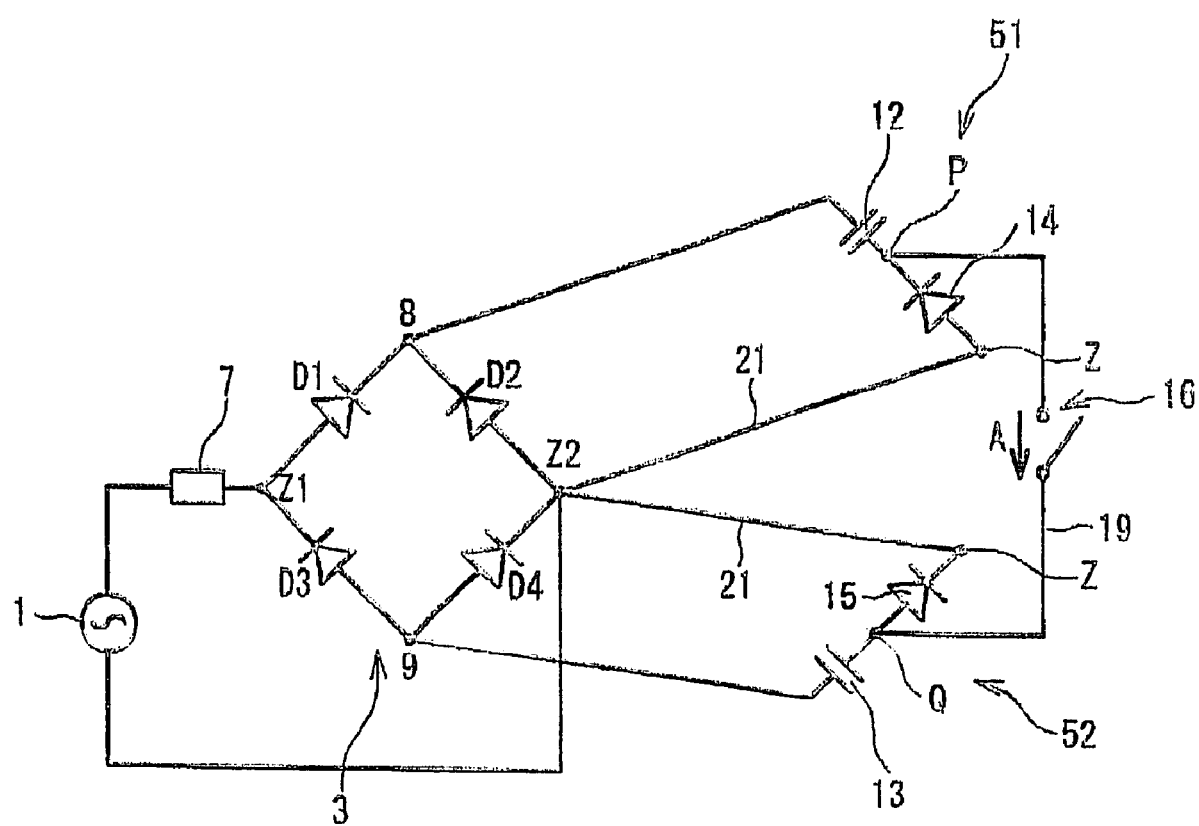
FIG. 16 is a circuit diagram showing an equivalent circuit of the power converter apparatus according to the first embodiment of the present invention.

FIG. 16 shows a circuit equivalent to the power converting circuit mentioned earlier. The rectifier circuit 3 has four connection nodes between four diodes. The four connection nodes are provided as the first AC power input node Z1, the second AC power input node Z2, the rectification voltage positive output node 8, and the rectification voltage negative output node 9. A representation of FIG. 16 is topologically identical or equivalent to the representation of FIG. 4, by the provision of the circuit constants. The first condenser 12 is connected to a connection node set {Z, X} among three connection node sets {Z, X, Y}, and the second condenser 13 is connected to a connection node set {Z, Y}. As shown in FIG. 4, two of the common lines 21 are provided as a single common line in actual. The switch used in the present invention has a switching function of selectively and alternately activating the charging and discharging circuit 51 including the first condenser 12, and the charging and discharging circuit 52 including the second condenser 13. Such a switch is formed to enable a combination of a short-circuited connection line having the AC power supply 1; the full-wave rectifier circuit 3; the reactor 7; the charging and discharging circuits 51 and 52; the operation mode control switch 16, and the common line 21 to make resonance. By substantially invalidating the alternate charging and discharging circuit by the operation mode control switch 16 in the open state (control of the power factor improvement in FIGS. 9D and 9E are left), the power converting apparatus is witched from the rated operation mode to a low load operation mode. A combination circuit of the charging and discharging circuits 51 and 52 connected to the rectifier circuit 3 in quasi-parallel is connected to the AC power supply 1 and alternately repeating the charging and discharging operation in correspondence to an AC cycle. However, the combination circuit is not configured as a voltage-doubling circuit.

The circuit constants (capacitances) of the condenser 12 and the condenser 13 contained in such a charging and discharging circuit are suppressed to a greatly lower value than the capacitance of the condenser in the conventional techniques (approximately one tenth). As a result of the provision of such circuit constants, the voltage-doubling circuit is completely or almost completely disappeared in the present invention. Peak values of the both condenser voltages are approximately equal to the peak output voltage Vm of the AC power supply 1. Consequently, high voltage endurance of all elements in the circuit is alleviated, and the miniaturization and the light weight can be realized. In a circuit section between the common node Z and the condenser 12 in the charging and discharging circuit, the polarity is given in which electric current flows from the common node Z to the condenser 12. In a circuit section between the common node Z and the condenser 13 in the charging and discharging circuit, the polarity is given in which electric current flows from the condenser 13 to the common node Z.

As described above, it is possible to further improve the power factor by making the input current Iin shown in FIG. 8B appropriate with the circuit constants, in correspondence to, or in synchronization with the AC cycle, not a constant DC voltage in the rated operation mode shown in FIG. 8E. Regarding the power factor improvement, it is important to design the first condenser 12 and the second condenser 13 to have capacitances lower than the conventional capacitance. In order to ensure the resonance discharge by discharging to zero voltage while suppressing the rise of voltage, it is important to appropriately select the circuit constants of the condensers, the reactor, the switching elements, resistances, and the diodes.

In the power converting apparatus of the present invention, although the common line 21 is short-circuited in principle, addition of an intermittent switch to control the current flow is not forbidden. The ON/OFF control is carried out by the intermittent switch in correspondence to, and particularly in synchronization with the cycle of the AC power supply. In principle, the switching element 16 is closed in the rated operation mode, and is open at the low load operation. However, it is not forbidden for the switching element 16 to be continuously or intermittently operated in the connection line 19 in a part of a half cycle, for the selection of the circuit constant or for stable low voltage resonance. The smoothing condenser 4 is connected in parallel with the charging and discharging circuit 11 between the positive output line 8 and negative output line 9 and may be placed outside the power converting circuit 10 board in FIG. 4. It is convenient for the sake of units exchange at the time of assembling, adjustment, or repair of a whole apparatus (an example: air-conditioning equipment). Addition of the diode 24 in the positive output line 8 between the first condenser 12 to the load 2 is greatly effective in that the values of the circuit constants can be reduced while ensuring the resonance, and back-flow is surely prevented. Also, the strength of the third and fifth higher harmonic waves is effectively suppressed while suppressing self-excitation.

The operation mode control switch 16 is added. The operation mode control switch 16 is inserted in the connection line 19. The operation mode control switch 16 is effectively used to switch the first operation mode of the rated operation and the second operation mode of the low load operation. The first operation mode is an operation in which the charging and discharging operations of the first charging and discharging circuit and the second charging and discharging circuit are alternately switched in synchronization with the cycle of the AC power supply 1. The second operation mode is different from the first operation mode and an operation in which the rectifier circuit 3 carries out rectification. Advantages of controlling the opening and closing of the operation mode control switch 16 in a half cycle in the first operation mode are as mentioned above. The operation mode control switch 16 is used for both the operation mode switching and the control of the opening and closing in a half cycle. As such a switch, use of the one-directional switch or the two-directional switch is possible, and the IGBT is particularly suitable. More specifically, it is preferable to carry out intermittently switching control between the node P and the node Q in the first operation mode, in synchronization with the AC cycle, especially the half cycle, of the AC power supply 1. On the other hand, it is preferable to carry out opening control of the node P and the node Q in the second operation mode, regardless of the AC cycle, of the AC power supply 1.

In the power converting apparatus of the present invention, the first charging and discharging circuit has the first polarity in which the electric current flows from the common node Z to the first condenser 12 in one direction, and the second charging and discharging circuit has the second polarity in which the electric current flows from the second condenser 13 to the common node Z in one direction. Such polarity simplifies a circuit configuration. Such a circuit configuration is further simplified by addition of diodes 14 and 15.

In the circuit representations in FIGS. 4 to 7, shown as the preferred embodiments of the power converting apparatus of the present invention, the ingle-phase AC power supply 1 is connected to the full-wave rectifier circuit 3 through the reactor 7; the smoothing condenser 4 is connected between the positive and negative output lines 8 and 9 of the full-wave rectifier circuit 3; and the first condenser 12 and the second condenser 13 are connected between the positive and negative output lines 8 and 9 of the full-wave rectifier circuit 3. One side of the first condenser 12 is connected to the positive output line 8 of the full-wave rectifier circuit 3, and another side of the first condenser 12 is connected to a cathode of the first diode 14. An anode of the first diode 14 and a cathode of the second diode 15 are connected. An anode of the second diode 15 and one side of the second condenser are connected, and another side of the second condenser 13 is connected to the negative output line 9 of the full-wave rectifier circuit 3. The IGBT 16 is connected between the cathode of the first diode 14 and the anode of the second diode 15 as the operation mode control switch. A control unit 20 controls the switch 16 in accordance with the load 2.

When the circuit is configured in the power supply voltage of 200V, the load of 1.5 kW, and the reactor of 16 mH, for example, as a more specific example for a circuit of FIG. 5, it is preferable that the first condenser 12 and the second condenser 13 have the same capacitance. For the alternate charging and discharging operation through alternation resonance, it is preferable that the capacitances of the first condenser 12 and the second condenser 13 are equal to or below 100 μF, which is lower than 1000 μF mentioned above (at 1.5 kW) by approximately one digit, more preferably equal to or below 50 μF and equal to or above 20 μF. If the capacitance is increased to a range of 100 μF to 500 μF, the electric current in back flow from the smoothing condenser 4 to the first condenser 12 may derivatively be generated. The diode 24 is added to prevent the foregoing back flow. If the back-flow is generated, it may be difficult to definitely obtain a waveform of a mountain shape shown in FIG. 9C in the low load operation mode. In the present invention in which the alternate charging and discharging operation is carried out once in correspondence to the one cycle of the power supply, the first condenser 12 and the second condenser 13 completely discharge down to the zero voltage without fail, as shown in FIG. 8C, and the electric current continues to flow to make the power factor much closer to 1, even when the capacitances of the both condensers are relatively high (100 μF to 500 μF).

A simulation is carried out of the operation of the power converting apparatus according to the first embodiment of the present invention shown in FIG. 5. In this simulation, correctly, the diode 24 in FIG. 5 was not provided. Because the switching element 16 was used in the ON state (the closed state), the voltage of the first or second condenser 12 or 13 and the voltage of the smoothing condenser 4 were same. Therefore, any short circuit current does not flow. Thus, the diode 24 is not necessary.

Figure 17:
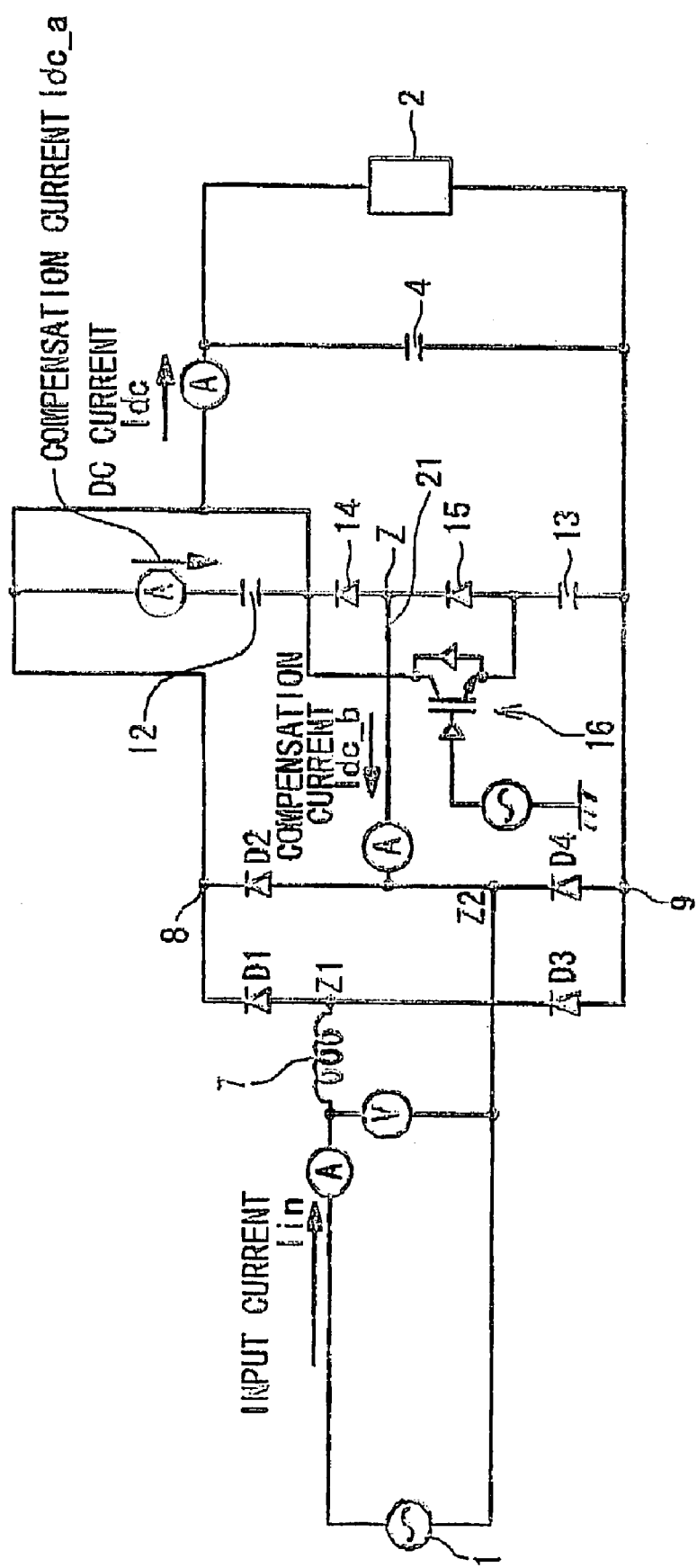
FIG. 17 is a circuit diagram when the operation of the power converter apparatus according to the first embodiment of the present invention is simulated.

The simulation was carried out by using a measurement circuit shown in FIG. 17. The input reactor 7 is set to a specific value, i.e., 16 mH. Thus, the simulation was carried out three times while changing the capacitances of the first condenser 12 and second condenser 13 in correspondence to the reactor 7, and the voltage and current of each section were measured. This simulation was carried out in the first operation mode (the rated operation mode).

Here, the rated operation mode is an operation mode that it is possible to cope with in case of rated load. Therefore, the simulation was carried out in the ON state of the switching element 16, that is, the connection line 19 was substantially short-circuited. It should be noted that in the rated operation mode, the load needs not to be rated load (100%) at all times, and may be 60% or 80% of the rated load be 60%.

The frequency of AC power supply 1 was 50 Hz which was one of the typical commercial cycles. The rated voltage was 200 V, the rated output was 1500 W, and the capacitance of the load condenser was set to 4700 μF which was general. The capacitances of the first-and second condensers 12 and 13 were identical to each other, because the identical or approximately identical capacitance was preferable. In an actual case, because it was sometimes difficult to select the condensers having a strictly identical capacitance, it is preferable to select condensers having the same rated capacitance. Here, if the actual capacitance values are same even if the name of the condenser is different, the condensers can be used. Although the aluminum electrolytic condenser or the film condenser which are commercially available has the deviation of + or −10%, the deviation is permissible. Therefore, the condensers having an identical name can be used in many cases.

Figure 2:
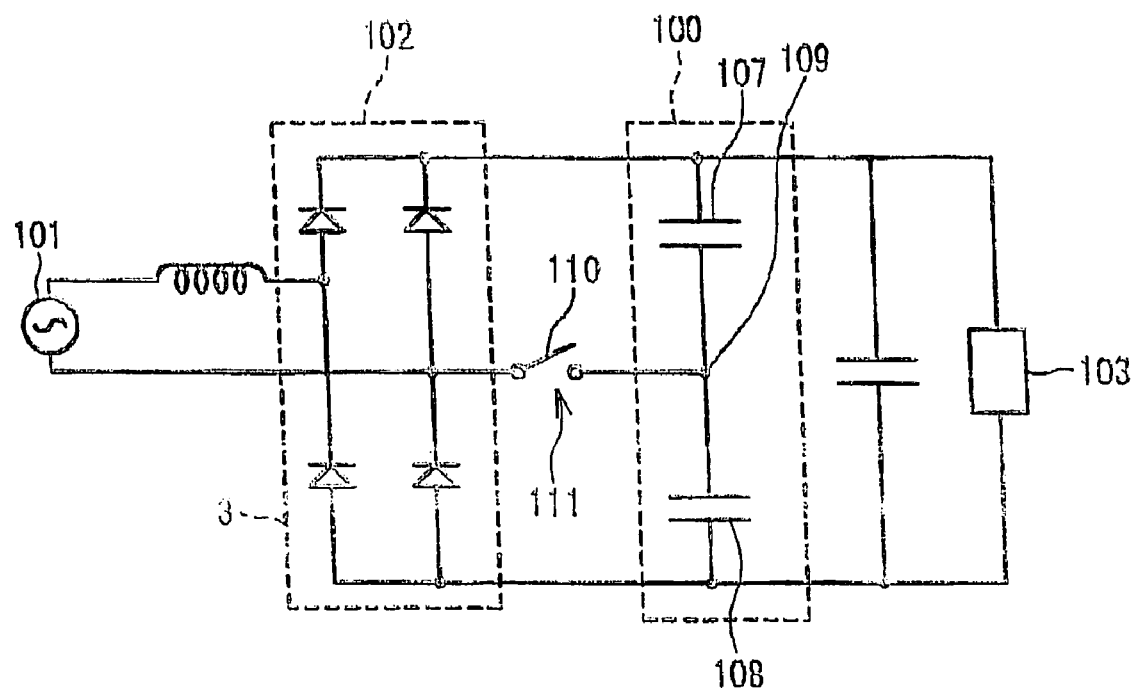
FIG. 2 is a circuit diagram showing a power converter apparatus as a second conventional example.

It should be noted that the first condenser 12 is equivalent to the condenser 107 in FIGS. 2 and 3 and the second condenser 13 is equivalent to the condenser 108 in FIGS. 2 and 3.

The simulation result and the consideration are presented below. For generalization of this simulation result, the resonance frequency $f_0$ is employed as a measure of evaluation in relation of the capacitance of the condenser and the inductance value of the reactor 7. Here, the resonance frequency is a frequency determined from the well known equation: $f_0 = 1/2\pi(LC)^{1/2}$, when the capacitance of the first or second condenser 12 is C and the inductance of reactor 7 is L.

Figure 18A:
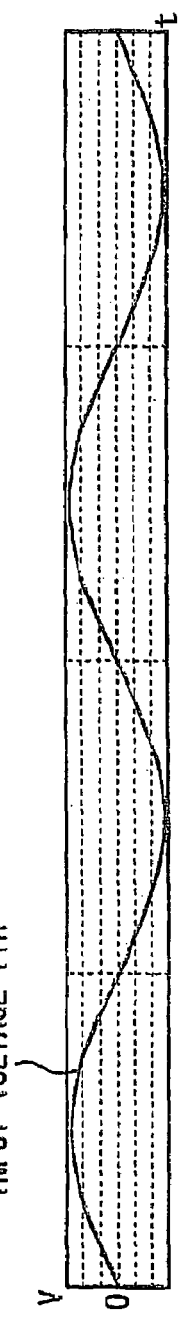
FIGS. 18A to 18E are diagrams showing waveforms of respective sections in a first specific instance of the power converter apparatus according to the first embodiment of the present invention.

FIGS. 18A to 18E are the simulation results for first time, and show voltage and current waveforms in each section when the capacitance of condensers 12 and 13 are 75 μF, and the resonance frequency $f_0$ is three times of the frequency of AC power supply 1. Here, the input voltage of FIG. 18A is input voltage from the AC power supply and was measured by a voltmeter Vin. Input electric current Iin is electric current flowing through the reactor 7. A compensation electric current Idc_a is electric current flowing through the condenser 12. DC current Idc is DC current measured in front of the smoothing condenser 4 (hereinafter, to be referred to as a "main condenser").

Figure 18B:
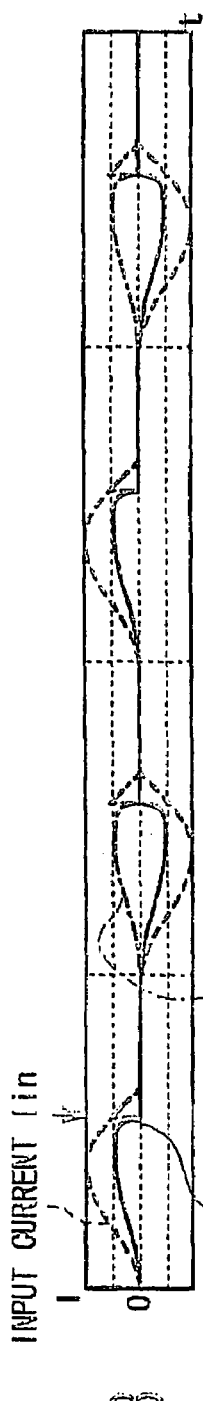
Figure 18C:
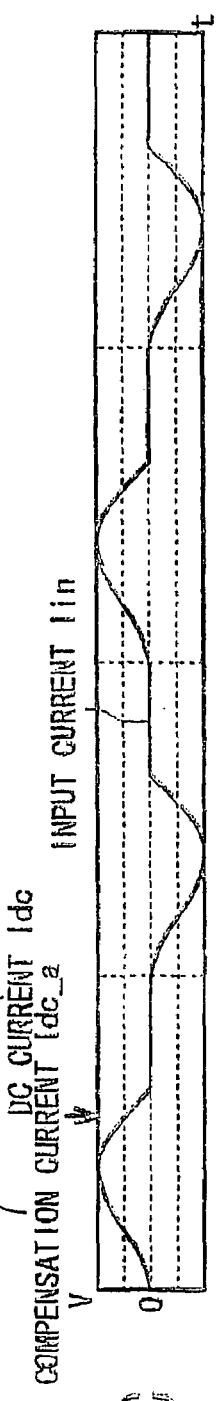
Figure 18D:
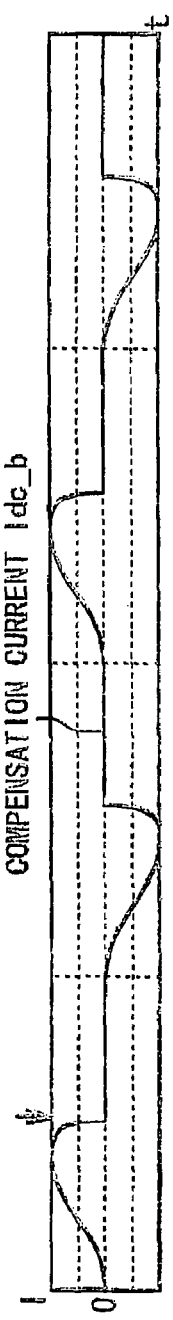
Figure 18E:
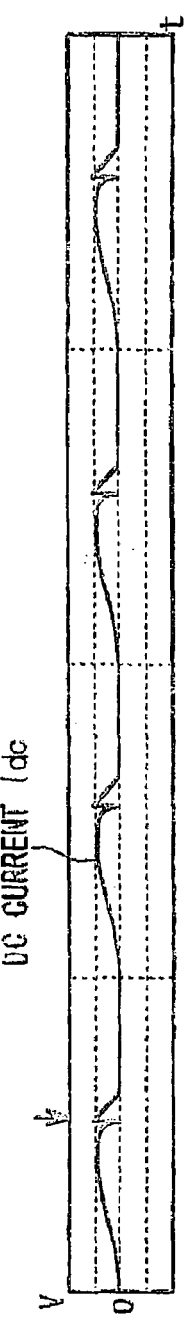
Figure 19A:
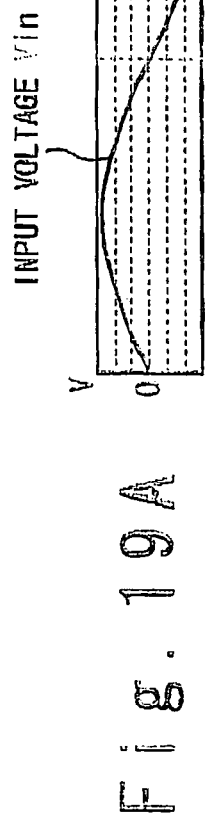
FIGS. 19A to 19E are diagrams showing waveforms of respective sections in a second specific instance of the power converter apparatus according to the first embodiment of the present invention.
Figure 19B:
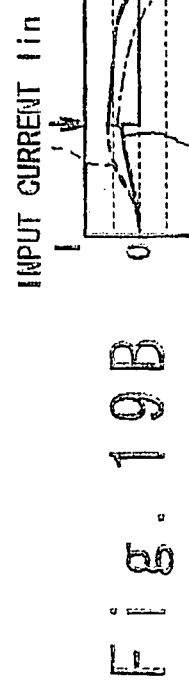
Figure 19C:
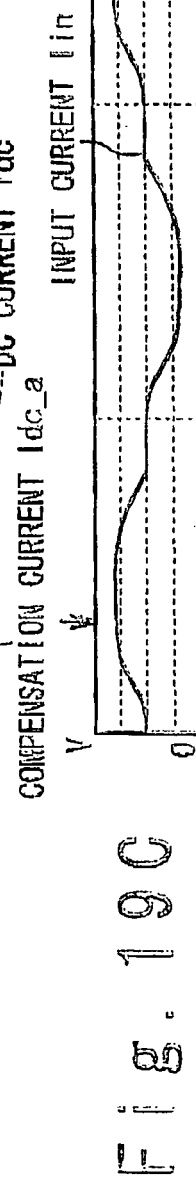
Figure 19D:
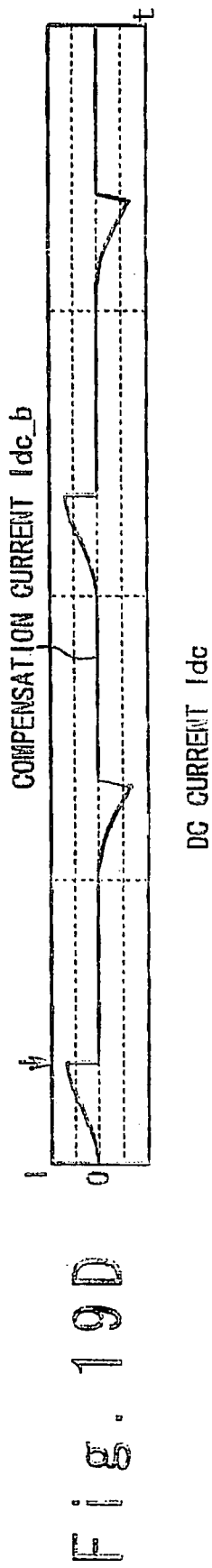
Figure 19E:
Figure 20A:
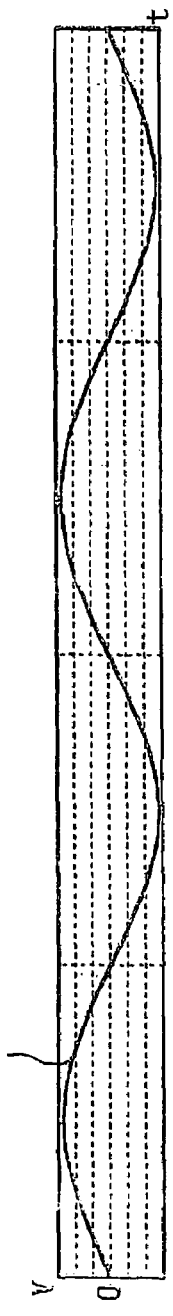
FIGS. 20A to 20E are diagrams showing waveforms of respective sections in a third specific instance of the power converter apparatus according to the first embodiment of the present invention.
Figure 20B:
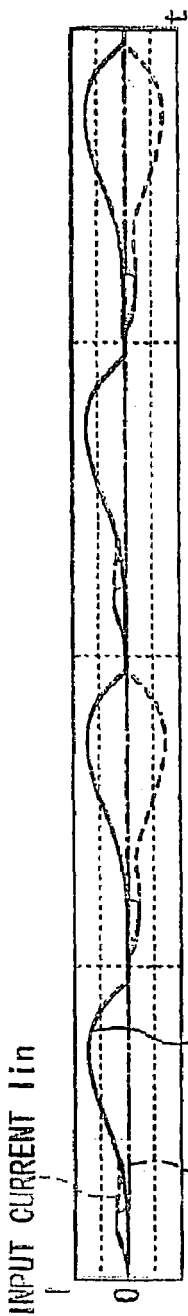
Figure 20C:
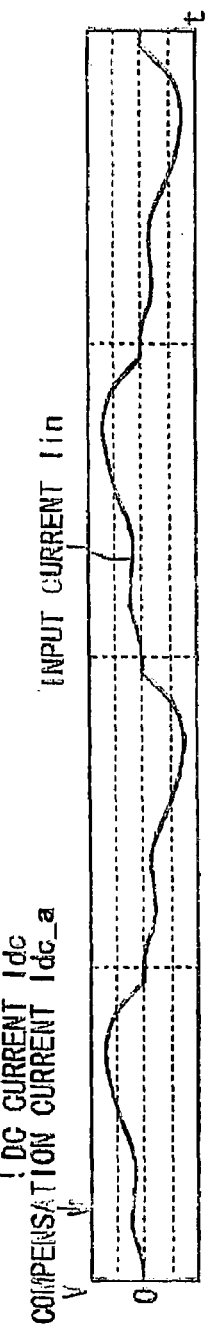
Figure 20D:
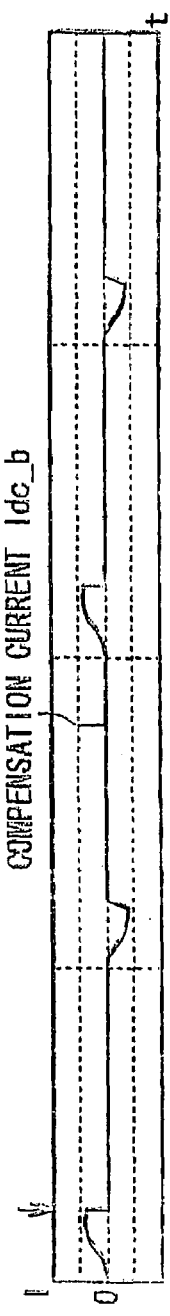
Figure 20E:
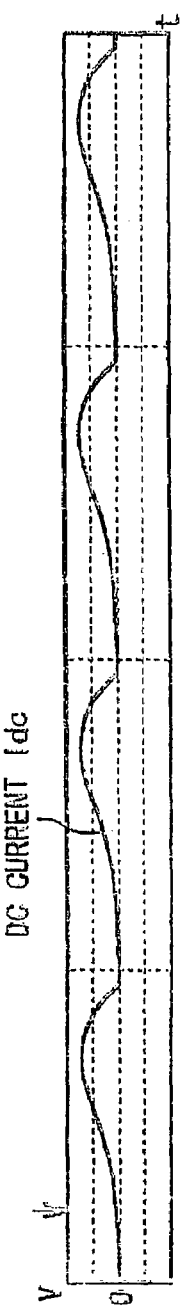

In the first half period in which the input voltage is positive, input electric current Iin becomes Iin=Idc_a+Idc. Also, in the second half period in which the input voltage is negative, the input current becomes Iin=Idc_a−Idc. FIG. 18B shows these currents in one graph. FIG. 18C shows only input electric current Iin. The compensation electric current Idc_b shown in FIG. 18D is electric current flowing through the common line 21. This current is equal to a summation of the charging current and discharging current in the condensers 12 and 13, and shows twice of the compensation electric current Idc_a. FIG. 18E shows DC electric current Idc independent. Also, the power factor in the circuit of FIG. 18 was 0.83.

FIG. 19 is the second simulation result, and shows the voltage and current waveforms in each section when the capacitance of the condensers 12 and 13 is 40 μF, and the above-mentioned resonance frequency $f_0$ is about 4 times of the frequency f of AC power supply 1. In this case, the power factor was 0.96.

Also, FIG. 20 is the third simulation result, and shows the voltage and current waveforms in each section when the capacitances of the condenser 12 and 13 is 13 μF, and the above-mentioned resonance frequency $f_0$ is about 7 times of the frequency f of AC power supply 1. In this case, the power factor was 0.89.

From the above three simulation results, the result is obtained that the power factor is highest when the resonance frequency $f_0$ is 4 times of the frequency of the AC power supply 1. Below, the general power factor characteristic will be discussed.

Generally, the effective electric power $P(\omega)$ in the load is given by the following equation. This equation indicates that the effective electric power is obtained as an average of an integral value of a product of the instantaneous AC voltage v applied to the load 2 and the instantaneous AC current i flowing through the load 2 over one period.

$$P(\omega) = (1/2\pi) \int_0^{2\pi} v * i \, d\omega t \quad (1)$$

Also, the apparent power $S(\omega)$ in the load 2 is given by the following equation.

$$P(\omega) = \left( (1/2\pi) \int_0^{2\pi} v^2 d\omega t \times (1/2\pi) \int_0^{2\pi} i^2 d\omega t \right)^{1/2} \quad (2)$$

The first term of the apparent power $S(\omega)$ indicates an effective value of load voltage and the second term indicate the effective value of the load electric current. The power factor (PF) is given as PF=$P(\omega)/S(\omega)$.

Therefore, in order to improve the power factor, the effective electric power P should be made large. For this purpose, it is first necessary to make phase difference $\Psi$ between the load voltage and the load electric current small. Next, it is necessary to make the apparent power S small. For this purpose, it is important to make the effective value of the electric current small, and thus, to suppress the peak value of the electric current.

Summarizing these results, it is preferable that the phase difference between the load voltage and the load electric current is made zero, and the load electric current has the same waveform as the sine voltage waveform, for the best power factor. Also, it is preferable that the peak value is equal to 1.41 times of the peak value of the load electric current. When the load electric current has a waveform different from the sine voltage waveform, the power factor decreases. Also, when the peak value is higher even in the same effective value, the power factor decreases. It is preferable that there is the uniform amplitude over the period.

From the above conclusion, the peak of the input electric current is large at the first simulation shown in FIGS. 18A to 18E and the third simulation shown in FIGS. 20A to 20E. Therefore, although the input electric power is the same, the effective current is large so that the power factor becomes decreases, in case of the input electric current of FIGS. 18A to 18E and FIGS. 20A to 20E. On the other hand, in case of the second simulation shown in FIGS. 19A to 19E, the peak of the input electric current is reduced. It should be noted that the fixed electric power load source of 1500 W is used in cases of FIGS. 18, 19 and 20.

Moreover, in case of FIGS. 18A to 18E, the compensation electric current is too large. In case of FIGS. 20A to 20E, the compensation electric current is too small. On the other hand, in case of FIGS. 19A to 19E, at the time of the peak of the compensation electric current Idc_b which flows through the common line 21, a DC electric current is switched to the smoothing condenser 4 which is provided in parallel to the load 2 in FIG. 5. Therefore, the power factor condition is met. It should be noted that in each figures, an arrow shows the switching time (the current path is switched to the main condenser 4 by the diode turning off automatically when the charging operation to the first or second condensers 12 or 13 ends). Also, in FIGS. 19A to 19E, the maximum value of the compensation electric current flowing through common line 21, i.e. the resonance electric current is approximately equal to the maximum value of the rated input electric current.

Here, the input electric current is the rated input electric current when it is assumed that the input electric current waveform from the AC power supply 1 is a sine wave. More specifically, it is the sine wave electric current obtained by dividing the rated electric power of the load by the effective value of the rated voltage of the AC power supply (the effective value of the sine wave).

On the other hand, in FIGS. 18A to 18E, the maximum value of the resonance electric current is too large. Also, in FIGS. 20A to 20E, the maximum value of the resonance electric current is too small. Therefore, the power factor is improved when the maximum value of the resonance electric current is substantially equal to the maximum value of the input rated electric current. The first embodiment of the present invention provides the circuit condition and method for meeting the power factor improvement condition.

It should be noted that by selecting the condensers and reactors with proper circuit constants in the present invention, the "charge period of voltage VC1 (condenser 12)" and the "discharge period of voltage VC2 (condenser 13)" are substantially fully synchronizes with each other, and the "discharge period of voltage VC1" and the "charge period of voltage VC2" are substantially fully synchronizes with each other. That is, the fact that "the condenser always discharges fully to the zero voltage as shown in FIG. 8C, and the electric current continues to flow" is already described.

In relation between the above fact and the three examination results, it was confirmed that the discharging operation was carried out until the voltage across the condenser reaches zero voltage as shown in FIG. 8C, in FIGS. 18, 19, and 20, although being not shown. Also, the charge period of condenser 12 and the discharge period of the condenser 13 are synchronized fully with each other, that is, it was confirmed that the charged condenser was discharged fully to the zero voltage, and then was charged.

However, the reason why there is the difference in the power factor is the difference in a resonance frequency. The resonance frequency is determined in the relation of the inductance value (L) of the reactor 7 and the capacitance value (C) of the condensers 12 and 13. Therefore, it is preferable to select the inductance value (L) of the reactor 7 and the capacitance value (C) of the condensers 12 and 13 such that the maximum value of the resonance electric current is approximately the same as the maximum value of the rated input electric current, as the show in FIG. 19.

On the other hand, in a usual power converting apparatus, the inductance of the reactor 7 is about 16 mH, and the capacitance value of condensers 12 and 13 is about 1000 μF or more. Under such conditions, the power factor becomes low. For this reason, the power factor is improved by using a switching element and so on. If the power converting circuit of the present invention is used, the good power factor can be obtained without carrying out a complicated switching operation.

In the above discussion, the capacitance value of the condenser is determined under the specific condition, by specifying the inductance value of the reactor 7. Therefore, based on above-mentioned assumption, the circuit constants for general design are considered using % impedance to be described below and the ratio of the square root of the ratio of the inductance value of the reactor to the capacitance value of the condenser to the % impedance. It should be noted that the word "condenser" means either of the condenser 12 or the condenser 13 for the simple explanation, because the both of the condensers 12 and 13 have the same capacitance.

When the following equation of the previous resonance frequency $$f_0 = 1/(2\pi)(LC)^{1/2}$$

is transformed, the following equation is obtained $$LC = 1/4\pi^2 f_0^2$$

Therefore, there are various combinations of L and C which meet this condition. For example, supposing the power supply frequency is 50 Hz, the resonance frequency is 200 Hz from $f_0=4f$. If the capacitance C of the condenser is 20 μF, the inductance L is about 32 mH. Also, supposing that the capacitance C is 10 μF, the inductance L is about 63 mH. In this way, various combinations are possible.

As described above, the simulation was carried out at the rated voltage of 200 V, the rated electric power of 1500 W, and the frequency of 50 Hz. In this case, when the rated voltage, the rated output, and the frequency are changed, the inductance of the reactor and the capacitance of the condenser can be found such that the % impedance becomes constant.

In order to determine the % impedance (hereinafter, to be referred to as "% Z"), the rated electric current In is first determined from the rated voltage Vn and the rated output Pn and then impedance is determined from $Zn=Vn/In$. Supposing that the frequency is f and a desirable inductance value of the reactor determined from the above simulation is La, the reactor impedance Zr is $Zr=2\pi fLa$. Therefore, % Zr (% Z of the reactor) can be determined from a ratio of Zr to Zn used in the simulation, i.e., % $Zr=Zr/Zn$. similarly, supposing that a desirable capacitance value of the condenser is Ca, the condenser capacitance Zc is $Zc=1/2\pi fCa$. Therefore, % Zc (% Z of the condenser) can be determined from % $Zc=Zc/Zn$.

By using the determined % Zr and % Zc, the specific inductance and capacitance of the reactor and condenser can be set for the change of the rated voltage, the rated electric power, and the frequency. For example, when the frequency is simply only changed from 50 Hz to 60 Hz and the other rated values are not changed, it is not necessary to change the inductance value of the reactor and the capacitance of the condenser because % Zr and % Zc are not changed. When the rated voltage is 100 V (½ in the simulation) and the rated output is 1000 W (⅔ in the simulation), the rated current is 10 A, and $Zn=10$. Therefore, the impedance becomes ⅜ times in comparison of $Zn=200/7.5=80/3$ in the above example. In this case, the inductance value of the reactor and the capacitance of the condenser are determined by multiplying the impedance Zr and Zc by ⅜, respectively.

Figure 21:
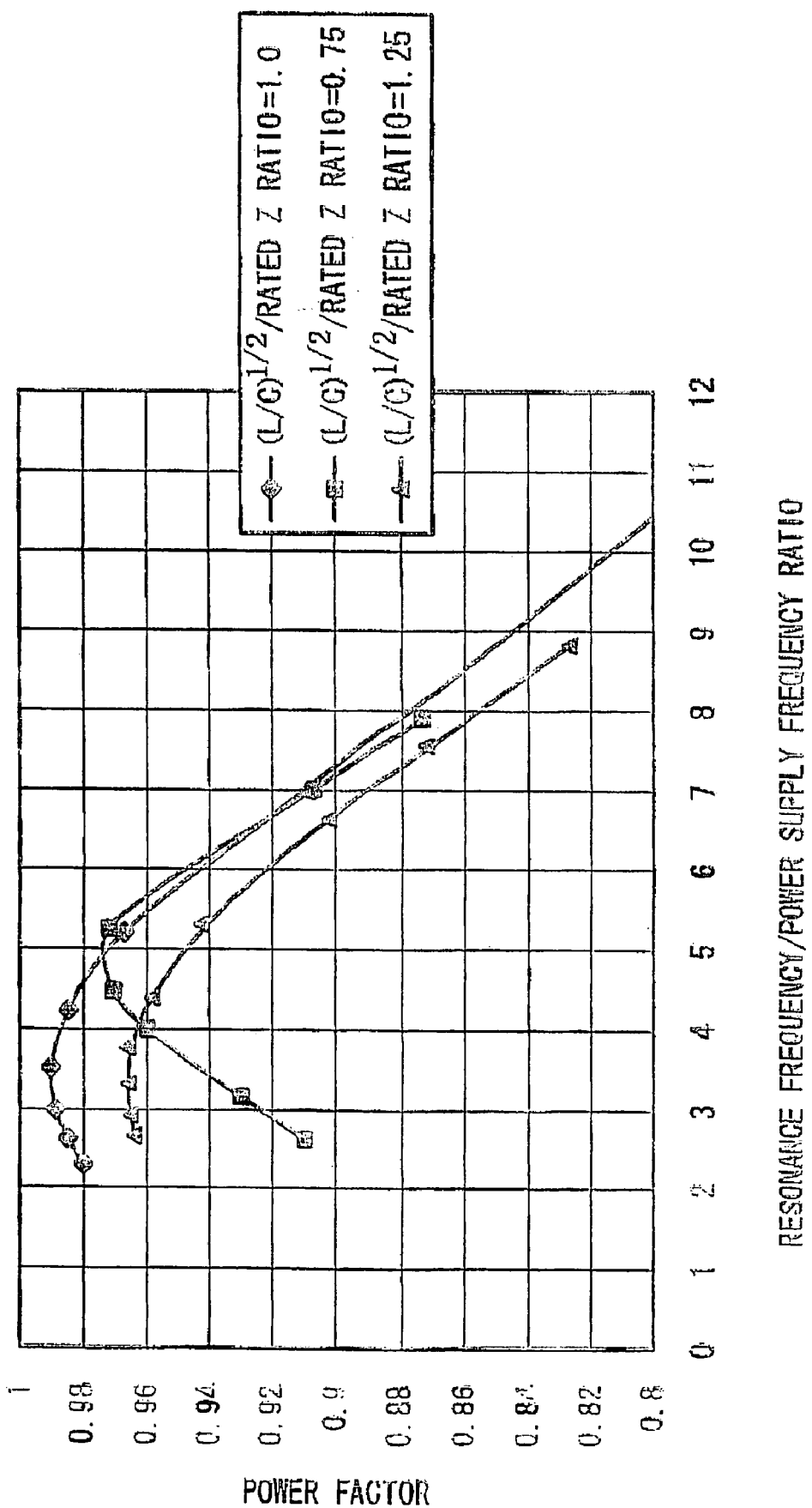
FIG. 21 is a graph showing a relationship between a ratio of resonance frequency to a power frequency and power factor in the simulation result of the power converter apparatus according to the first embodiment of the present invention.
Figure 22:
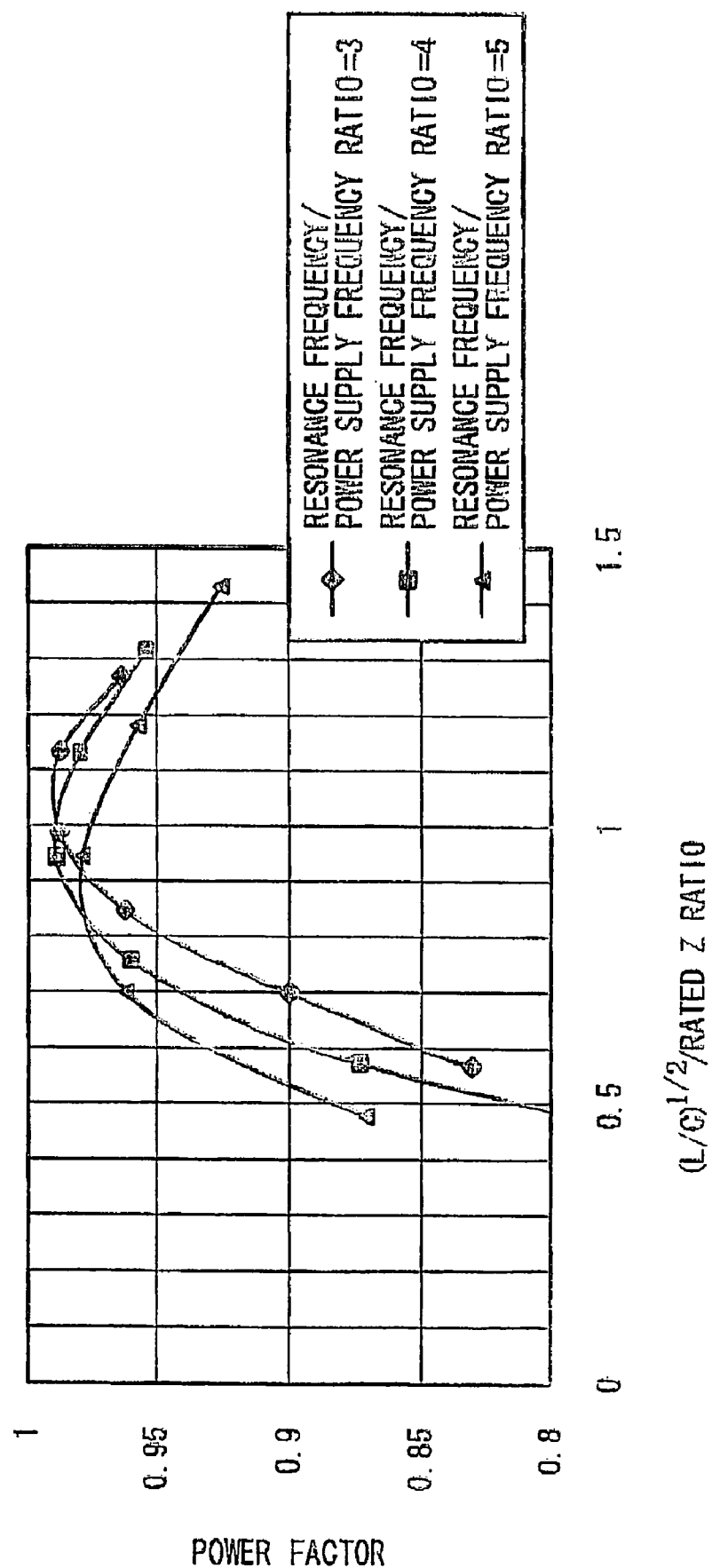
FIG. 22 is a graph showing a relationship between a ratio of $(L/C)^{1/2}$ to rated impedance and power factor in the simulation result of the power converter apparatus according to the first embodiment of the present invention.

The general design method was considered based on the examined rated impedance described above, and a square root of a ratio of the inductance value (L) of the reactor and the capacitance value (C) of the condenser, i.e., $(L/C)^{1/2}$. Here, the reason why $(L/C)^{1/2}$ is used-as one measure is that $Zr*Zc=La/Ca$ because $Zr=2\pi fLa$ and $Zc=1/2\pi fCa$ as mentioned above. Thus, it is assumed that the square root became one measure. A result of simulation which is carried out over an extensive value range by using this square root value and the above-mentioned rated impedance (rated Z) is shown in FIGS. 21 and 22. Referring to FIGS. 21 and 22, it is found that a multiplying factor of the resonance frequency to the AC power supply frequency depended on $(L/C)^{1/2}$/rated Z. However, when these data were considered, it was found that the multiplying factor of the resonance frequency to the AC power supply frequency is preferably in a range of about 2.7 to 5.4 or below. In other words, it is possible to say that the resonance frequency is desirably from about 3 times to about 5 times of AC power supply frequency.

Assuming that the power supply frequency is 50 Hz, the capacitance value of the condenser is 1000 μF and the inductance value of the reactor is 16 mH, in the conventional power converting apparatus, the resonance frequency about 0.8 times the frequency of the AC power supply and very low, because the resonance frequency is about 40 HZ. Also, although the multiplying factor of the resonance frequency to the AC power supply frequency changes depending on the value of the $(L/C)^{1/2}$/rated Z, it is preferable that the inductance value of the reactor is as small as possible, from the viewpoint of cost reduction. Also, it is also preferable that the capacitance value of the condenser is small in a range. It could be understood from the FIG. 22 that as for the relation between the capacitance value of the condenser and the inductance value of the reactor, the value of the $(L/C)^{1/2}$/rated Z, i.e., a ratio of the square root of a ratio of the inductance value of the reactor to the capacitance value of the condenser to the rated impedance Z, which is obtained by dividing the rated electric power by the rated voltage, is preferably in a range of 0.7 to 1.2, although a suitable range of the value of the $(L/C)^{1/2}$/rated Z is restraint. Generally, the price of the reactor tends to become expensive rapidly as the inductance value becomes large. Therefore, if the inductance value is made as small as possible, it is more preferable that the above range is from 0.7 to 1.0. In case of FIG. 19 (the second simulation), the value of $(L/C)^{1/2}$/rated Z is 0.75 and the value of $(L/C)^{1/2}$/rated Z meets the condition of the range of 0.7 to 1.0.

As a modification of this embodiment of the present invention, the number of degrees of freedom of the position of the reactor 7 is improved. In other words, in FIG. 4, the reactor 7 is provided between the AC power supply 1 and the rectifier circuit 3, and in the same way, the reactor 7 is provided between the AC power supply 1 and the rectifier circuit 3 in FIGS. 5, 6, and 7. However, the reactor 7 may be provided between the rectifier circuit 3 and the charging and discharging circuit 11, although being not shown. In this case, if being not shown but explaining with reference to FIG. 16, the reactor 7 may be provided between the rectifier circuit 3 and the first charging and discharging circuit 51, more specifically, between the positive output line 8 of the rectifier circuit 3 and the first condenser 12.

As described above with reference to FIG. 8 and so on, the feature of the present invention is the power factor improvement by the resonance electric current of the reactor 7 and the condensers 12 and 13, and the condensers 12 and 13 always discharge to the zero voltage once to one period of the AC power supply. This is a factor necessary to improve the efficiency.

Moreover, in order to improve the power factor, the inductance value of the reactor and the capacitance value of the condenser are determined in such a manner that the maximum value of the resonance electric current is made approximately same as the maximum value of the rated input electric current.

The specific values of the resonance frequency already described and the values of the % impedance and so on are only examples specified based on above basic idea.

Figure 23:
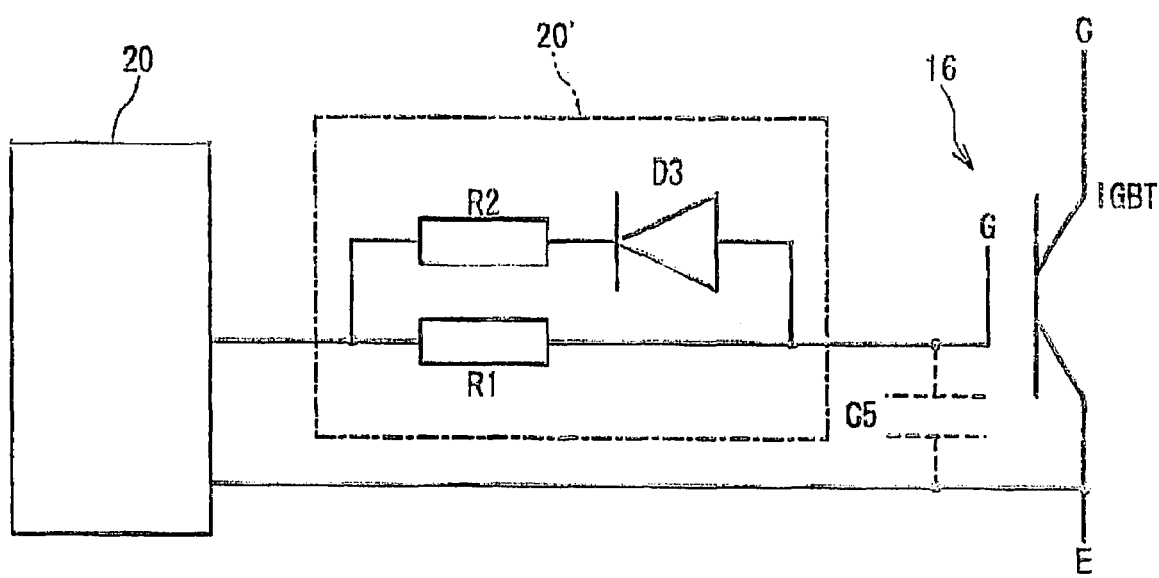
FIG. 23 is a diagram showing a part of the circuit of the power converter apparatus according to a fifth embodiment of the present invention.

FIG. 23 shows a additional circuit for omitting the diode 24 from the circuit shown in FIG. 5. In the resonance mode, it is sufficient that the IGBT is turned on or off in the case of the rated operation mode or the low lead operation mode, and it is not necessary to switch once for every period of the power supply voltage. When the IGBT is turned on, a short circuit electric current flows between the smoothing condenser 4 and the resonance condenser. The IGBT sometimes damages when there is not the diode 24. Therefore, the diode 24 is provided in the embodiment of FIG. 5, as described above.

However, it is not desirable from the viewpoint of the cost to provide the diode 24 for the IGBT which does not always operate. Thus, as shown in FIG. 23, when a turn-on control signal is supplied from the drive circuit 20 to the gate of IGBT, the turn-on control signal is delayed to set the IGBT in an active region. Thereby, an over-current is restrained to the IGBT in the active region, and the IGBT is not damaged even if the diode 24 is not provided. This addition circuit is shown in FIG. 23 by a dashed line. The additional circuit 20' is provided between the general drive circuit 20 for IGBT shown in FIG. 5 and the gate of the IGBT 16. As shown in FIG. 23, a series circuit of a resistor R2 and a diode D3 is arranged in parallel to a resistor R1. The resistance of the resistor R1 is very larger than the resistance of the resistor R2. Also, the diode D3 is arranged between the resistor R2 and the gate of the IGBT 16 in a reverse direction. The IGBT or FET has an equivalent condenser C5 of the gate. It is sufficient to add a circuit section to the drive circuit 20 shown in FIG. 5 to delay the charging of the equivalent condenser. In other words, because only a high resistance R1 functions due to the orientation of the diode in the charging operation of the equivalent condenser in FIG. 23, a time constant with the equivalent condenser becomes large so that the charging operation is late. At the time of discharge, the resistor functions and the smooth discharging operation is carried out with no problem.

Figure 24:
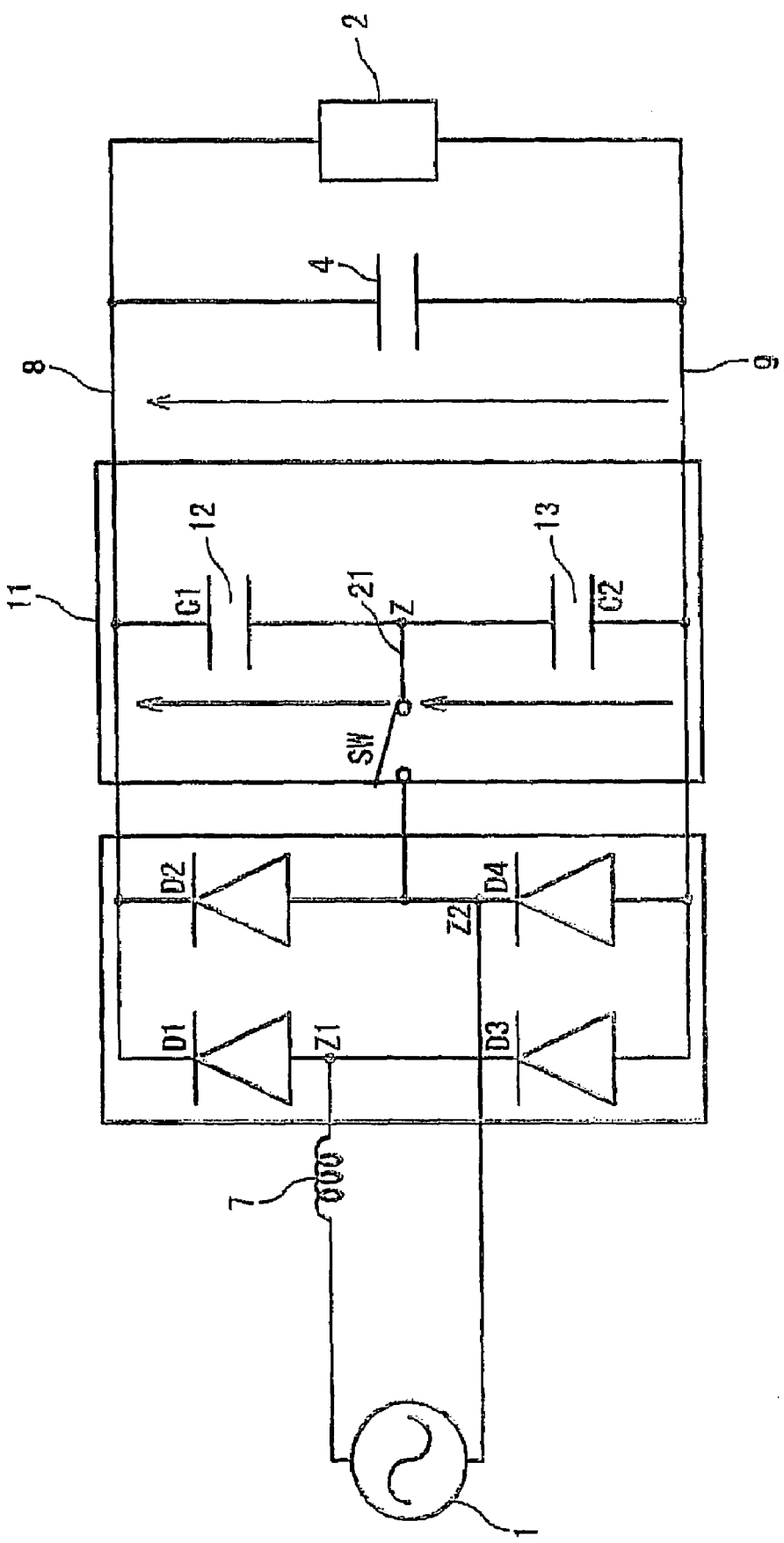
FIG. 24 is a diagram showing a part of the circuit of the power converter apparatus according to a sixth embodiment of the present invention.

FIG. 24 shows a part of the circuit example of the power converting apparatus according to the sixth embodiment of the present invention. In this embodiment, a mechanical switch SW such as a relay can be used instead of the IGBT. In this case, the circuit shown in FIGS. 5, 6, and 7 are not desirable because the short circuit electric current flows. The reason is the first and second condensers 12 and 13 are not charged to the voltage of the main condenser 4 if the switch SW is turned off on the charging way of the first or second condensers 12 and 13. For this reason, when the switch SW is turned on at the next time, the short circuit electric current flows due to the voltage difference with the main condenser 4. Therefore, the circuit shown in FIG. 24 is desirable.

The circuit shown in FIG. 24 is seemed to be similar to the circuit in the conventional example. However, the circuit shown in FIG. 24 is different from the conventional example in the following point. That is, the circuit in the conventional example improves the power factor by switching the switch once for one period of the power supply. However, because the power factor is improved through the resonance in the present invention, it is not necessary for the switch SW to operate once for one period of the power supply. Only when the DC voltage is controlled, the switch must be switched once in one period.

Figure 25:
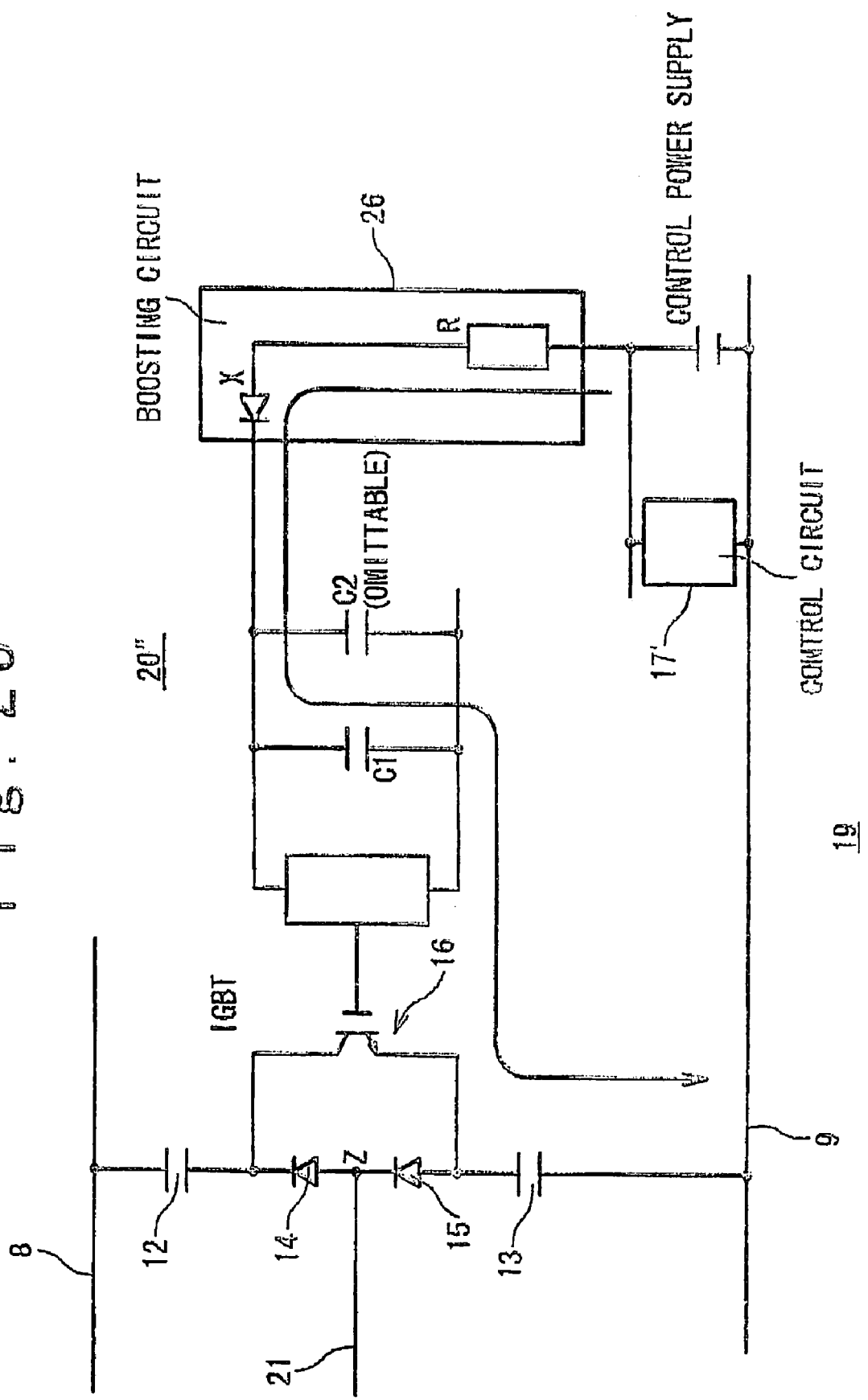
FIG. 25 is a diagram showing a part of the circuit of the power converter apparatus according to a modification of the sixth embodiment of the present invention.

FIG. 25 shows the power converting apparatus according to the seventh embodiment of the present invention, in which a power supply for a drive circuit conventionally required for the IGBT is omitted. Although the description is not given with reference to FIG. 5, the power supply for the drive circuit for the IGBT necessitates a ground line of a control power supply different from the negative line 9, because the voltage of the emitter of the IGBT is influenced by a charge function of a condenser c13. Therefore, a dedicated power supply line must be provided from an external unit. However, this is not preferable from respect of the number of parts and thereby cost. In the power converting apparatus in the seventh embodiment, this problem is eliminated. In the power converting circuit, the IGBT is connected between the two resonance condensers 12 and 13 and these condensers 12 and 13 are connected with the positive output line 8 and the negative output line 9 from the rectifier 3. Because a resonance condenser 13 is provided between the emitter of this IGBT and the negative output line 9, it is seen so as not to use a booster circuit (practices when a P side power supply of an inverter is made). However, in this embodiment of the present invention, the resonance condensers 12 and 13 always fall once to 0V in one period of the power supply. It is equivalent to that the emitter of the IGBT is connected to the negative output line 9 when the IGBT is turned on. Therefore, the IGBT can be driven by the drive circuit 20" containing a booster circuit 26 as shown in FIG. 25. That is, the above purpose is achieved by inserting a booster circuit 20" of FIG. 25 in which a resistor and a diode are connected in series, in the conventional drive circuit 20 shown in FIG. 5.

It should be noted that the booster circuit 26 of FIG. 25 does not control the IGBT by using an independent control power supply. A control power supply and the control circuit 17' are provided in the power converting circuit and are used by the whole circuit of FIG. 25 containing the booster circuit 26 in common. A power supply voltage is applied to the drive circuit 20 shown in FIG. 5 by condensers C1 and C2, which is omittable, through a resistance and a diode from the control power supply and the drive circuit 20 drives the gate of the IGBT. Thereby, the independent drive power supply for the IGBT, which was necessary to the conventional example, can be omitted.

The power converting apparatus and the power converting method according to the present invention effectively improve the power factor. As the embodiments, the number of circuit elements is decreased.

What is claimed is:

1. A power converting apparatus comprising:
a rectifying circuit having a pair of AC power input terminals and a pair of rectified voltage output terminals;
an inductor; and
a charging and discharging circuit connected between said rectified voltage output terminals,
wherein said charging and discharging circuit comprises:
a first charging and discharging circuit connected with one of said rectified voltage output terminals and one of said AC power input terminals; and
a second charging and discharging circuit connected with the other of said rectified voltage output terminals and said one AC power input terminal,
said first charging and discharging circuit comprises a first diode and a first capacitor connected with said first diode in series,
said second charging and discharging circuit comprises a second diode and a second capacitor connected with said second diode in series, and
said charging and discharging circuit further comprises:
a switch section connected in parallel with a series connection of said first and second diodes,
said inductor generates a resonance current together with said first capacitor and said second capacitor, and
said second capacitor discharges to zero voltage while said first capacitor is charged.

2. The power converting apparatus according to claim 1, wherein said switch section comprises two switches which are connected in parallel with said first and second diodes, respectively.

3. The power converting apparatus according to claim 1, wherein said switch comprises a switching element.

4. The power converting apparatus according to claim 2, wherein each of said switches comprises a switching element.

5. A power converting circuit comprising:
a rectifying circuit having a pair of AC power supply input terminals and a pair of rectification voltage output terminals;
a charging and discharging circuit connected between the rectification voltage output terminals; and
an inductor connected with one of the AC power supply input terminals,
wherein said charging and discharging circuit comprises a first capacitor, a first diode, a second diode and a second capacitor, which are connected in this order in series between the rectification voltage output terminals, and
wherein one of the AC power input terminals is connected with a common node between said first diode and said second diode,
said first capacitor is connected between one of the rectification voltage output terminals and said first diode,
said first diode is connected between said first capacitor and said common node,
said second diode is connected between said common node and said second capacitor, and
said second capacitor is connected between the other of the rectification voltage output terminals and said second diode.

6. The power converting circuit according to claim 5, wherein one of the AC power input terminals is connected with said common node.

7. The power converting circuit according to claim 5, wherein said charging and discharging circuit further comprises:
a switching element connected in parallel with said first diode and said second diode between said first capacitor and said second capacitor.

* * * * *